US011768092B2

(12) United States Patent
Gledhill, III et al.

(10) Patent No.: US 11,768,092 B2
(45) Date of Patent: Sep. 26, 2023

(54) FLOW SENSOR DEVICES AND SYSTEMS

(71) Applicant: Blue-White Industries, Ltd., Huntington Beach, CA (US)

(72) Inventors: Robert Gledhill, III, Huntington Beach, CA (US); John Nguyen, Fountain Valley, CA (US); Patrick M. Murphy, Irvine, CA (US); William M. McDowell, Garden Grove, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

(21) Appl. No.: 17/451,213

(22) Filed: Oct. 18, 2021

(65) Prior Publication Data

US 2022/0276082 A1    Sep. 1, 2022

Related U.S. Application Data

(63) Continuation of application No. 15/713,440, filed on Sep. 22, 2017, now Pat. No. 11,150,118.

(60) Provisional application No. 62/399,216, filed on Sep. 23, 2016.

(51) Int. Cl.
| | | |
|---|---|---|
| *G01F 1/66* | (2022.01) | |
| *G01F 15/18* | (2006.01) | |
| *G01F 1/667* | (2022.01) | |
| *G01F 15/14* | (2006.01) | |
| *G01N 29/22* | (2006.01) | |

(52) U.S. Cl.
CPC ............... *G01F 1/66* (2013.01); *G01F 1/662* (2013.01); *G01F 1/667* (2013.01); *G01F 15/14* (2013.01); *G01F 15/18* (2013.01); *G01N 29/22* (2013.01)

(58) Field of Classification Search
CPC . G01F 1/66; G01F 1/662; G01F 15/18; G01F 1/667; G01F 15/14; G01N 29/22
USPC ........................................................ 73/861.28
See application file for complete search history.

(56) References Cited

U.S. PATENT DOCUMENTS

| | | | | |
|---|---|---|---|---|
| 1,087,988 A | * | 2/1914 | Sheldon | G01F 1/46 |
| | | | | 73/861.66 |
| 1,508,017 A | * | 9/1924 | Greve | G01F 1/46 |
| | | | | 73/861.66 |
| 1,556,910 A | * | 10/1925 | Cabot | G01F 1/375 |
| | | | | 73/861.49 |

(Continued)

FOREIGN PATENT DOCUMENTS

| | | |
|---|---|---|
| CN | 104198003 | 12/2014 |
| CN | 204142306 U | 2/2015 |

(Continued)

*Primary Examiner* — Nathaniel T Woodward
*Assistant Examiner* — Philip L Cotey
(74) *Attorney, Agent, or Firm* — Knobbe, Martens, Olson & Bear, LLP

(57) ABSTRACT

A flow rate assembly can include a housing having a measurement channel extending along the housing axis and through a portion of the housing between the first and second ends of the housing, an outer cup portion positioned at least partly within the housing, and a transducer positioned within the outer cup portion and sealed from fluid flow past the outer cup portion, the transducer having a width perpendicular to the housing axis and greater than the width of the measurement channel, the transducer configured to generate an ultrasonic signal and to direct the ultrasonic signal through the measurement channel.

13 Claims, 15 Drawing Sheets

(56) References Cited

U.S. PATENT DOCUMENTS

| | | | | |
|---|---|---|---|---|
| 1,577,909 A | * | 3/1926 | Kath | G01F 1/375 73/861.49 |
| 1,621,354 A | * | 3/1927 | Dawley | G01F 1/72 138/44 |
| 1,674,481 A | * | 6/1928 | Paulison, Jr. | G01F 1/375 73/713 |
| 1,858,399 A | * | 5/1932 | Jones | G01F 1/375 285/125.1 |
| 1,891,155 A | * | 12/1932 | Harrison | G01F 1/372 73/713 |
| 1,898,951 A | * | 2/1933 | Goodwin | G01F 9/026 235/1 R |
| 1,916,920 A | * | 7/1933 | Diehl | G01F 1/375 73/713 |
| 1,924,076 A | * | 8/1933 | Wallace | G01F 1/37 73/861.49 |
| 1,935,508 A | * | 11/1933 | Lanham | G01F 1/375 346/31 |
| 2,344,512 A | * | 3/1944 | Lanham | G01F 1/375 200/183 |
| 2,679,163 A | * | 5/1954 | Morris | G01P 5/165 73/167 |
| 2,686,429 A | * | 8/1954 | West | G01F 1/375 73/713 |
| 2,704,342 A | * | 3/1955 | John | G01F 23/245 318/482 |
| 2,714,168 A | * | 7/1955 | Hencke | G01F 1/372 73/713 |
| 3,140,606 A | * | 7/1964 | Kramer | G01F 1/28 73/290 R |
| 3,581,565 A | * | 6/1971 | Dieterich | G01F 1/46 73/861.66 |
| 3,803,921 A | * | 4/1974 | Dieterich | G01F 1/46 73/863.61 |
| 3,831,448 A | * | 8/1974 | Kors | G01F 1/46 73/747 |
| 3,838,599 A | * | 10/1974 | Purtell | E21B 10/46 73/861.49 |
| 4,003,252 A | * | 1/1977 | Dewath | G01F 1/66 73/861.27 |
| 4,154,100 A | * | 5/1979 | Harbaugh | G01F 1/46 73/861.66 |
| 4,164,865 A | * | 8/1979 | Hall | G01F 1/66 73/861.28 |
| 4,290,314 A | * | 9/1981 | Geronime | G01F 1/40 73/861.52 |
| 4,453,419 A | * | 6/1984 | Engelke | G01F 1/46 73/861.66 |
| 4,546,655 A | * | 10/1985 | Victor | G01F 1/46 73/861.66 |
| 4,696,194 A | * | 9/1987 | Taylor | G01F 1/46 73/861.66 |
| 4,703,661 A | * | 11/1987 | Evers | G01F 1/46 73/861.66 |
| 4,719,806 A | * | 1/1988 | Craigen | G01F 1/46 73/861.52 |
| 5,014,559 A | * | 5/1991 | Lew | G01F 1/24 73/861.56 |
| 5,036,711 A | * | 8/1991 | Good | G01F 1/46 73/861.66 |
| 5,043,706 A | * | 8/1991 | Oliver | G01P 5/245 73/19.1 |
| 5,052,230 A | * | 10/1991 | Lang | G01F 1/667 73/861.28 |
| 5,243,863 A | * | 9/1993 | Gill | G01F 1/662 73/861.28 |
| 5,383,369 A | * | 1/1995 | Khuri-Yakub | G01P 5/245 73/571 |
| 5,461,931 A | * | 10/1995 | Gill | G01F 1/662 73/861.27 |
| 5,717,145 A | * | 2/1998 | Yasuhara | G01F 1/662 73/861.28 |
| 5,768,937 A | * | 6/1998 | Wajid | G01F 1/662 73/24.01 |
| 5,817,950 A | * | 10/1998 | Wiklund | G01F 1/46 73/861.66 |
| 5,864,067 A | * | 1/1999 | Ligneul | G01F 1/667 73/861.21 |
| 5,905,207 A | * | 5/1999 | Schalk | G01F 1/662 73/861.28 |
| 5,969,266 A | * | 10/1999 | Mahoney | G01F 1/46 73/861.65 |
| 5,971,011 A | * | 10/1999 | Price | E03B 7/071 137/460 |
| 6,298,735 B1 | * | 10/2001 | Dias | G01F 1/667 73/861.29 |
| 6,321,166 B1 | * | 11/2001 | Evans | G01F 1/40 702/50 |
| 6,487,918 B1 | * | 12/2002 | DeAngelis | G01F 1/46 73/861.66 |
| 6,575,044 B1 | * | 6/2003 | Feller | G01F 1/662 73/861.27 |
| 6,658,710 B2 | * | 12/2003 | Dias | G01F 1/667 29/25.35 |
| 6,957,586 B2 | * | 10/2005 | Sprague | G01F 1/3259 73/32 R |
| 6,973,833 B2 | * | 12/2005 | Ginesi | G01F 1/662 73/861.23 |
| 7,001,153 B2 | * | 2/2006 | McDowell | F04B 43/1253 417/63 |
| 7,213,468 B2 | * | 5/2007 | Fujimoto | G01N 29/222 73/861.27 |
| 7,243,556 B2 | * | 7/2007 | Gryc | G01F 1/46 73/861.65 |
| 7,284,964 B2 | * | 10/2007 | McDowell | F04B 43/1253 417/63 |
| 7,343,823 B2 | * | 3/2008 | Speldrich | G01F 5/00 73/202 |
| 7,360,448 B2 | * | 4/2008 | Maginnis | G01F 1/662 73/861.27 |
| 7,373,840 B2 | * | 5/2008 | Kamimura | G01F 1/662 73/861.27 |
| 7,383,741 B2 | * | 6/2008 | Fukano | G01F 1/667 73/861.27 |
| 7,415,893 B2 | * | 8/2008 | Takeda | G01F 1/663 73/861.18 |
| 7,423,931 B2 | * | 9/2008 | Martin, II | H04B 13/00 367/83 |
| 7,497,138 B2 | * | 3/2009 | Kubinski | F01N 13/008 73/23.31 |
| 7,819,022 B2 | * | 10/2010 | Hope | G01F 25/10 73/861.52 |
| 7,823,463 B1 | * | 11/2010 | Feller | G01F 1/667 73/861.27 |
| 7,870,793 B1 | * | 1/2011 | Feller | G01F 1/662 73/861.27 |
| 7,963,174 B2 | * | 6/2011 | Kamimura | G01F 1/662 73/861.27 |
| 7,997,149 B1 | * | 8/2011 | Dam | G01F 1/667 73/861.11 |
| 8,181,536 B2 | * | 5/2012 | Augenstein | G01F 1/662 73/861.28 |
| 8,215,931 B2 | * | 7/2012 | McDowell | B25B 33/00 417/33 |
| 8,336,574 B2 | * | 12/2012 | Kranz | G05D 16/0683 137/484.4 |
| 8,418,364 B2 | * | 4/2013 | McDowell | B25B 33/00 29/888.021 |
| 8,505,391 B1 | * | 8/2013 | Baumoel | G01F 1/667 73/649 |
| 8,522,623 B2 | * | 9/2013 | Quin | G01F 15/14 73/861.28 |
| 8,522,624 B2 | * | 9/2013 | Quin | F17D 1/20 73/861.28 |
| 8,584,531 B2 | * | 11/2013 | Liao | G01F 1/66 73/861.28 |
| 8,590,397 B2 | * | 11/2013 | Augenstein | G01F 1/667 73/861.28 |

(56) References Cited

U.S. PATENT DOCUMENTS

| | | | | |
|---|---|---|---|---|
| 8,639,363 B2* | 1/2014 | Gledhill, III | | G05B 15/02 |
| | | | | 700/282 |
| 8,640,529 B2* | 2/2014 | Sinha | | G01F 1/668 |
| | | | | 73/61.61 |
| 8,783,116 B2* | 7/2014 | Hasunuma | | G01F 1/74 |
| | | | | 73/861.27 |
| 8,960,017 B2* | 2/2015 | Schwarz | | G01F 1/66 |
| | | | | 73/861.25 |
| 8,997,848 B2* | 4/2015 | Quin | | G01F 1/662 |
| | | | | 73/861.27 |
| 9,062,994 B2* | 6/2015 | Ifft | | G01F 1/42 |
| 9,134,157 B2* | 9/2015 | Van Klooster | | G01F 1/667 |
| 9,151,648 B2* | 10/2015 | Strom | | G01F 15/18 |
| 9,157,775 B2* | 10/2015 | Strom | | G01F 1/50 |
| 9,182,259 B2* | 11/2015 | Suzuki | | G01F 1/66 |
| 9,194,730 B2* | 11/2015 | Frisby | | G01N 29/036 |
| 9,228,870 B2* | 1/2016 | Quin | | G01F 15/10 |
| 9,234,779 B2* | 1/2016 | Sinha | | G01F 15/024 |
| 9,250,108 B2* | 2/2016 | Wiklund | | G01F 1/37 |
| 9,261,389 B2* | 2/2016 | Gill | | G01F 1/662 |
| 9,297,680 B2* | 3/2016 | Maruyama | | G01F 1/662 |
| 9,297,681 B2* | 3/2016 | Speidel | | G01F 15/18 |
| 9,310,236 B2* | 4/2016 | Baumoel | | G01F 1/662 |
| 9,347,809 B2* | 5/2016 | Iwasa | | G01F 1/662 |
| 9,366,556 B2* | 6/2016 | Schwarz | | G01F 1/663 |
| 9,374,024 B2* | 6/2016 | Nguyen | | H02N 11/006 |
| 9,383,236 B2* | 7/2016 | Kempner | | G01F 15/18 |
| 9,389,109 B2* | 7/2016 | Gledhill, III | | G01F 15/14 |
| 9,423,283 B2* | 8/2016 | Strom | | G01F 1/46 |
| 9,702,743 B2* | 7/2017 | Strom | | G01F 1/3218 |
| 9,777,720 B2 | 10/2017 | Gledhill, III et al. | | |
| 9,828,984 B2 | 11/2017 | Gledhill, III et al. | | |
| 9,845,672 B2* | 12/2017 | Di | | E21B 47/107 |
| 9,909,579 B2 | 3/2018 | Gledhill, III et al. | | |
| 9,996,089 B2 | 6/2018 | Gledhill, III et al. | | |
| 10,330,094 B2 | 6/2019 | Gledhill, III et al. | | |
| 10,948,320 B2 | 3/2021 | Gledhill, III et al. | | |
| 11,131,300 B2 | 9/2021 | Gledhill, III et al. | | |
| 11,150,118 B2 | 10/2021 | Gledhill, III et al. | | |
| 11,221,004 B2 | 1/2022 | Gledhill, III et al. | | |
| 11,261,857 B2 | 3/2022 | Gledhill, III et al. | | |
| D959,238 S | 8/2022 | Nguyen et al. | | |
| 11,402,248 B2 | 8/2022 | Gledhill, III et al. | | |
| 11,485,653 B2 | 11/2022 | Gledhill, III et al. | | |
| 11,578,716 B2 | 2/2023 | Gledhill, III et al. | | |
| 2003/0041679 A1* | 3/2003 | Allen | | G01N 29/222 |
| | | | | 73/866.5 |
| 2003/0079557 A1* | 5/2003 | Tatum | | G01F 1/662 |
| | | | | 73/866.5 |
| 2004/0194554 A1* | 10/2004 | Nestle | | G01F 1/36 |
| | | | | 73/861.49 |
| 2004/0250629 A1* | 12/2004 | Turner | | G01F 1/58 |
| | | | | 73/861.77 |
| 2009/0071264 A1* | 3/2009 | Wray | | G01F 25/10 |
| | | | | 73/861.12 |
| 2009/0240445 A1* | 9/2009 | Umekage | | G01F 1/66 |
| | | | | 702/45 |
| 2010/0005655 A1 | 1/2010 | Nguyen | | |
| 2010/0226469 A1* | 9/2010 | Mori | | G21C 17/032 |
| | | | | 376/361 |
| 2011/0180172 A1* | 7/2011 | Gledhill, III | | F16L 39/02 |
| | | | | 138/111 |
| 2011/0226052 A1 | 9/2011 | Speldrich et al. | | |
| 2012/0247225 A1* | 10/2012 | Allen | | G01F 1/662 |
| | | | | 73/861.18 |
| 2012/0272748 A1* | 11/2012 | Watanabe | | G01F 1/668 |
| | | | | 73/861.18 |
| 2013/0124131 A1* | 5/2013 | Murakami | | G01F 1/662 |
| | | | | 702/100 |
| 2013/0345996 A1* | 12/2013 | Satoh | | G01F 1/74 |
| | | | | 702/48 |
| 2014/0083199 A1* | 3/2014 | Rogers | | G01F 1/588 |
| | | | | 73/861.12 |
| 2014/0091675 A1* | 4/2014 | Nguyen | | H02N 11/006 |
| | | | | 310/300 |
| 2014/0174561 A1* | 6/2014 | Hagihara | | G01F 1/66 |
| | | | | 137/455 |
| 2014/0260664 A1* | 9/2014 | Gledhill, III | | G01F 15/18 |
| | | | | 73/861.18 |
| 2015/0127275 A1* | 5/2015 | Hies | | G01F 1/662 |
| | | | | 702/48 |
| 2015/0160053 A1* | 6/2015 | Baumoel | | G01F 1/668 |
| | | | | 73/861.28 |
| 2015/0211509 A1* | 7/2015 | Gledhill, III | | F04B 43/026 |
| | | | | 417/413.1 |
| 2015/0260560 A1* | 9/2015 | Quin | | G01F 1/667 |
| | | | | 73/861.27 |
| 2015/0308870 A1* | 10/2015 | Gottlieb | | E21B 47/10 |
| | | | | 73/861.28 |
| 2016/0116317 A1* | 4/2016 | Zhang | | G01F 1/662 |
| | | | | 73/861.25 |
| 2016/0377463 A1* | 12/2016 | Kalvoda | | G01F 1/075 |
| | | | | 73/861.11 |
| 2017/0139430 A1 | 5/2017 | Gledhill, III et al. | | |
| 2018/0085701 A1* | 3/2018 | Chellappan | | B01D 39/12 |
| 2018/0087942 A1* | 3/2018 | Gledhill, III | | G01F 1/662 |
| 2018/0149504 A1* | 5/2018 | Zipperer | | G01F 1/667 |
| 2018/0291886 A1 | 10/2018 | Gledhill, III et al. | | |
| 2018/0298891 A1 | 10/2018 | Gledhill, III et al. | | |
| 2019/0017499 A1 | 1/2019 | Gledhill, III et al. | | |
| 2019/0101936 A1 | 4/2019 | Gledhill, III et al. | | |
| 2019/0107419 A1* | 4/2019 | Zipperer | | G01F 1/662 |
| 2020/0149522 A1 | 5/2020 | Gledhill, III et al. | | |
| 2020/0386593 A1* | 12/2020 | Nguyen | | G01F 1/662 |
| 2021/0047209 A1 | 2/2021 | Gledhill, III et al. | | |
| 2021/0054963 A1 | 2/2021 | Nguyen et al. | | |
| 2021/0064735 A1 | 3/2021 | Gledhill, III et al. | | |
| 2021/0324845 A1 | 10/2021 | Nguyen et al. | | |
| 2021/0348602 A1 | 11/2021 | Nguyen et al. | | |
| 2022/0034693 A1 | 2/2022 | Gledhill, III et al. | | |
| 2022/0099083 A1 | 3/2022 | Gledhill, III et al. | | |
| 2022/0276082 A1 | 9/2022 | Gledhill, III et al. | | |
| 2022/0316463 A1 | 10/2022 | Gledhill, III et al. | | |
| 2023/0015391 A1 | 1/2023 | Nguyen et al. | | |

FOREIGN PATENT DOCUMENTS

| | | |
|---|---|---|
| CN | 105318920 A | 2/2016 |
| CN | 205403870 U | 7/2016 |
| CN | 208921194 U | 5/2019 |
| EP | 0152132 A1 | 8/1985 |
| EP | 2759808 A1 | 7/2014 |
| GB | 1229536 A | 4/1971 |
| GB | 2012056 A | 7/1979 |
| JP | 2002-151458 | 5/2002 |
| JP | 5773414 B2 | 7/2015 |
| KR | 1020140056886 | 5/2014 |
| WO | WO 94/20822 | 9/1994 |
| WO | WO 2018/063990 A1 | 4/2018 |

\* cited by examiner

FLOW SENSOR DEVICES AND SYSTEMS

CROSS REFERENCE TO RELATED APPLICATIONS

This application is a continuation of U.S. patent application Ser. No. 15/713,440, filed Sep. 22, 2017, titled FLOW SENSOR DEVICES AND SYSTEMS, which claims the benefit under 35 U.S.C. 119(e) to U.S. Provisional App. No. 62/399,216, filed Sep. 23, 2016, titled FLOW SENSOR DEVICES AND SYSTEMS. The entire contents of the above-identified patent applications are incorporated by reference herein and made a part of this specification. Any and all applications for which a foreign or domestic priority claim is identified in the Application Data Sheet as filed with eh present application are hereby incorporated by reference under 37 CFR 1.57.

TECHNICAL FIELD

Certain embodiments discussed herein relate to devices and systems for measuring flow rate of fluid through pipes.

DISCUSSION OF THE RELATED ART

Many varieties of ultrasonic transducer assemblies exist, employing a variety of techniques and mechanisms for installing the transducer assemblies on a fluid conduit. However, such devices and certain components thereof have various limitations and disadvantages.

SUMMARY OF THE INVENTIONS

Traditionally, clamp-on transducers have been favored by ultrasonic flow meter manufacturers due to their one-size-fits-all transducer design that simplifies manufacturing and minimizes inventory. Clamp-on transducer type flow meters may be preferred because they have no moving parts, no wetted materials, and do not require a system shut-down for installation.

However, traditional clamp-on transducers require multiple installation details in order to operate correctly, such as: pipe material, pipe wall thickness, pipe inside diameter, pipe liner (if any), and fluid type. Furthermore, additional installation details are often difficult to obtain and detect, such as: the smoothness of the outer pipe wall, the smoothness of the inner pipe wall (defects in surface), and the eccentricity of the pipe (which may not be zero). The inner wall smoothness and eccentricity of the pipe are difficult to determine in the field and can drastically affect the accuracy of clamp-on ultrasonic flow meters.

Clamp-on transducers require a silicon grease (or similar substance) between the outer pipe wall and the bottom of the transducer to fill and eliminate any air gaps. This grease needs to be replaced periodically, especially in outdoor or dry locations, leading to increased maintenance requirements.

Due to the number of installation details needed for a successful installation of clamp-on ultrasonic transducers, successful installation may not occur in every situation. Additionally, clamp-on transducers are susceptible to being unintentionally moved by external forces, such as a passers-by knocking or hitting transducers by mistake. Any shift in the clamp-on transducer can jeopardize the flow measurement accuracy.

Installing clamp-on transducers can often frustrate an installer that is new to this type of technology. Even for those familiar with the process, properly addressing the plumbing details required for installation can be difficult, resulting in prolonged installation time periods.

While in-line transducers have also been developed, they suffer from performance challenges.

According to some variants, a flow rate assembly includes a housing having a housing axis, a first end having an inlet positioned along the housing axis, a second end having an outlet positioned along the housing axis, and/or a measurement channel extending along the housing axis and through a portion of the housing between the first and second ends of the housing, the measurement channel having a width perpendicular to the housing axis. In some embodiments, the assembly includes an outer cup portion positioned at least partly within the housing. The outer cup portion can include a head portion connected to a wall of the housing, an elongate portion connected to the head portion, the elongate portion having a first face facing the measurement channel, and/or at least one flow channel through the head portion configured to permit fluid to flow past the outer cup portion through the at least one flow channel. The assembly can include a transducer positioned within the elongate portion and sealed from fluid flow past the outer cup portion, the transducer having a width perpendicular to the housing axis and greater than the width of the measurement channel, the transducer configured to generate an ultrasonic signal and to direct the ultrasonic signal through the measurement channel. In some embodiments, a ratio of a distance between the first face of the elongate portion and the measurement channel, as measured parallel to the housing axis, to the width of the transducer is less than 4:5. In some embodiments, the first and second ends of the housing are configured to mate with open pipe end in an in-line manner.

In some embodiments, the assembly includes a second outer cup portion positioned at least partially within the housing. The second outer cup portion can include an outer head portion connected to a wall of the housing, an elongate portion connected to the head portion, and/or at least one flow channel through the head portion configured to permit fluid to flow past the outer cup portion through the at least one flow channel. In some embodiments, the assembly includes a second transducer positioned within the elongate portion of the second outer cup portion and sealed from fluid flow past the second outer cup portion, the second transducer having a width perpendicular to the housing axis and greater than the width of the measurement channel. In some embodiments, the second transducer is configured generate an ultrasonic signal and to direct the ultrasonic signal through the measurement channel toward the first transducer.

In some embodiments, the outer cup portion comprises at least one boundary wall extending between the head portion and the elongate portion and forming a boundary of the at least one flow channel, wherein the at least one boundary wall is configured to straighten flow through the at least one flow channel.

In some embodiments, the outer cup portion includes an outlet channel extending between an interior of the elongate portion and an exterior of the elongate portion.

In some embodiments, the outlet channel extends through the at least one boundary wall.

In some embodiments, the housing comprises a first housing portion, a second housing portion, and third housing portion positioned between the first and second housing portions, wherein the measurement channel extends through the third housing portion.

In some embodiments, one or more electrical components are positioned within a space between the third housing portion and the first housing portion.

According to some variants, a flow rate assembly can include a housing having a housing axis, a first end having an inlet positioned along the housing axis, a second end having an outlet positioned along the housing axis, a measurement channel extending along the housing axis and through a portion of the housing between the first and second ends of the housing, the measurement channel having a width perpendicular to the housing axis, and/or a first housing chamber between the measurement channel and the inlet, as measured along the housing axis, the first housing chamber having a tapered inner wall. The assembly can include an outer cup portion positioned at least partly within the first housing chamber. The outer cup portion can include a head portion connected to a wall of the housing, an elongate portion connected to the head portion, the elongate portion having a tapered portion between the first face and the inlet and the measurement channel, and/or at least one flow channel through the head portion configured to permit fluid to flow past the outer cup portion through the at least one flow channel. The assembly can include a transducer positioned within the elongate portion and sealed from fluid flow past the outer cup portion, the transducer having a width perpendicular to the housing axis and greater than the width of the measurement channel, the transducer configured to generate an ultrasonic signal and to direct the ultrasonic signal through the measurement channel. In some embodiments, the tapered inner wall of the first housing chamber is substantially the same shape as the tapered portion of the elongate portion of the outer cup portion.

In some embodiments, the outer cup portion is spin welded to the housing.

In some embodiments, the assembly includes a cap positioned at the first end of the housing and forming the inlet, wherein the cap is configured to engage with an open fluid conduit.

In some embodiments, the cap is spin welded to the outer cup portion.

In some embodiments, the transducer is fluidly isolated from fluid flowing through the assembly.

In some embodiments, the assembly includes an inner cup portion positioned at least partially within the elongate portion of the outer cup portion, wherein the transducer is positioned within the inner cup portion and wherein a connection between the inner cup portion and the outer cup portion forms a seal to inhibit or prevent fluid ingress into the elongate portion of the outer cup portion.

In some embodiments, the inner cup portion has a flat face facing the measurement channel.

According to some variants, a flow rate assembly includes a housing having a housing axis, a first end having an inlet positioned along the housing axis, a second end having an outlet positioned along the housing axis, and/or a measurement channel extending along the housing axis and through a portion of the housing between the first and second ends of the housing, the measurement channel having a width perpendicular to the housing axis. The assembly can include an outer cup portion positioned at least partly within the housing, the outer cup portion including a head portion connected to a wall of the housing, an elongate portion connected to the head portion, the elongate portion having a first face facing the measurement channel, and at least one flow channel through the head portion configured to permit fluid to flow past the outer cup portion through the at least one flow channel. The assembly can include a transducer positioned within the elongate portion and sealed from fluid flow past the outer cup portion, the transducer having a width perpendicular to the housing axis and greater than the width of the measurement channel, the transducer configured to generate an ultrasonic signal and to direct the ultrasonic signal through the measurement channel. In some embodiments, a ratio of a distance between the first face of the elongate portion and the measurement channel, as measured parallel to the housing axis, and the width of the measurement channel is less than 1:1.

In some embodiments, the housing comprises a first housing, a second housing, and a third housing positioned between the first and second housings, wherein the flow rate assembly includes at least one fastener that extends at least partially through each of the first, second, and third housings to connect the first, second, and third housings to each other.

In some embodiments, the flow rate assembly is configured to precisely and accurately measure flow rates through the measurement channel as low as 10 mL/min.

In some embodiments, the flow rate assembly is configured to precisely and accurately measure flow rates through the measurement channel as low as 5 mL/min.

In some embodiments, the width of the measurement channel is approximately 0.25 inches.

BRIEF DESCRIPTION OF THE DRAWINGS

The present inventions are described with reference to the accompanying drawings, in which like reference characters reference like elements, and wherein.

DETAILED DESCRIPTION OF THE INVENTIONS

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Ultrasonic transducer assemblies are used to measure flow characteristics of fluid flowing through pipes or other fluid lines. The transducer assemblies can include two or more transducers configured to send and receive ultrasonic signals through the fluid line and corresponding fluid. Transducer assemblies can indicate such parameters as the velocity of the fluid through the fluid line. Transducer assemblies can be used in conjunction with pumps and other devices to monitor and/or control flow rates through fluid lines.

The transducers used in traditional transducer assemblies often must be precisely aligned with the longitudinal axis of the fluid line on which they are installed. Misalignment of the transducers can increase the likelihood that the ultrasonic signals sent from the first transducer will not be received by the second transducer. Further, many transducer assemblies rely on reflection of the ultrasonic signals off of the interior surface of the pipe. Thus, the assemblies must be carefully calibrated to account for the pipe characteristics (e.g., size, material, etc.) as well as the fluid characteristics (e.g., composition, temperature, etc.).

Inline type ultrasonic flow meters can reduce installation time and improve flow measurement accuracy since several difficult to determine variables necessary for a successful installation may be removed. Inline flow meters having axially-aligned transducers can reduce or eliminate the need to reflect signals off of the interior walls of the pipe. As such, the transducers may not need to be realigned when used with different fluid types.

Furthermore, some embodiments of an inline flow meter can reduce inventory holding cost. Since the annular diameter of the flow passage of the inline flow meter can be controlled at the time of manufacture, several models with varying annular diameters can be made. External pipes of varying diameters may be connected to each model of the inline flow meter. Therefore, in some embodiments, an inline flow meter having a given diameter may be used with a range of pipe diameters. This reduces the amount of inventory required while also improving the measuring accuracy, due to the other variables, identified above, that may be controlled during manufacture of the flow meter.

Figure 1:
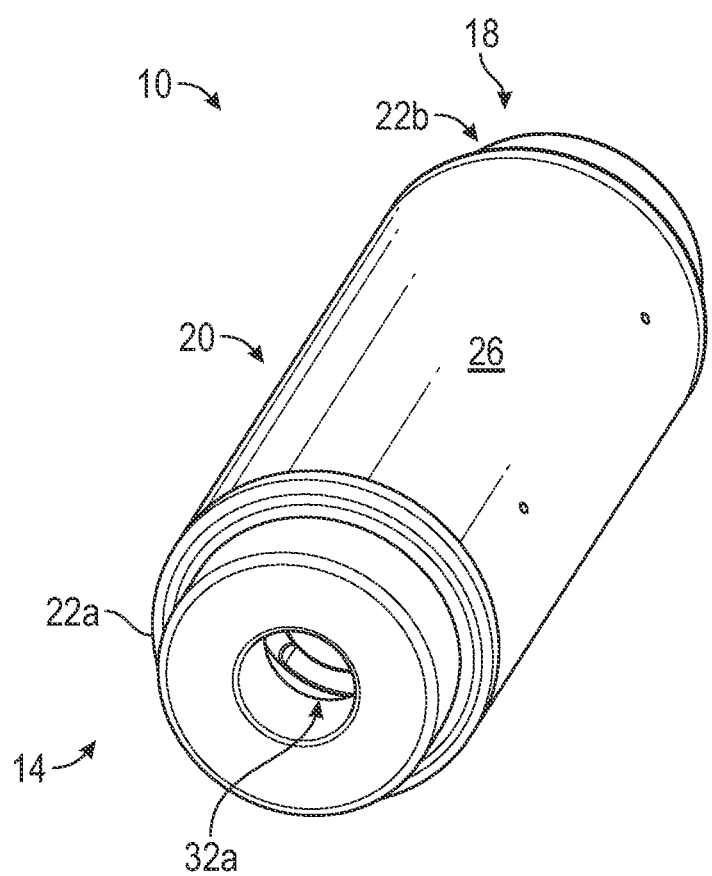
FIG. 1 is a perspective view of a flow meter assembly.

An embodiment of a flow meter assembly 10 is illustrated in FIG. 1. The flow meter assembly 10 has a first end 14 and a second end 18. The ends 14, 18 of the sensor assembly 10 can be configured to connect in-line with a pipe (not shown). In some embodiments, each of the first and second ends 14, 18 are similar or identical in structure.

The flow meter assembly 10 can include a central portion 20. The central portion 20 can extend between the first and second ends 14, 18. In some embodiments, the first and second ends 14, 18 comprise respective caps 22a and 22b. The central portion 20 can comprise a housing 26. The housing 26 can include a housing axis 27. The housing axis 27 can extend along a length of the housing 26 and through the first and second ends 14, 18 of the flow meter assembly 10. In some embodiments, the housing axis 27 is parallel to the length of the housing 26. One or more sensors, transducer, and/or other components can be positioned within the housing 26 and/or within the caps 22a, 22b. The caps 22a, 22b can be constructed separate from the housing 26 and can be connected to opposite ends of the housing 26 during assembly. In some embodiments, the caps 22a, 22b are removable from the housing 26 after assembly.

Figure 2:
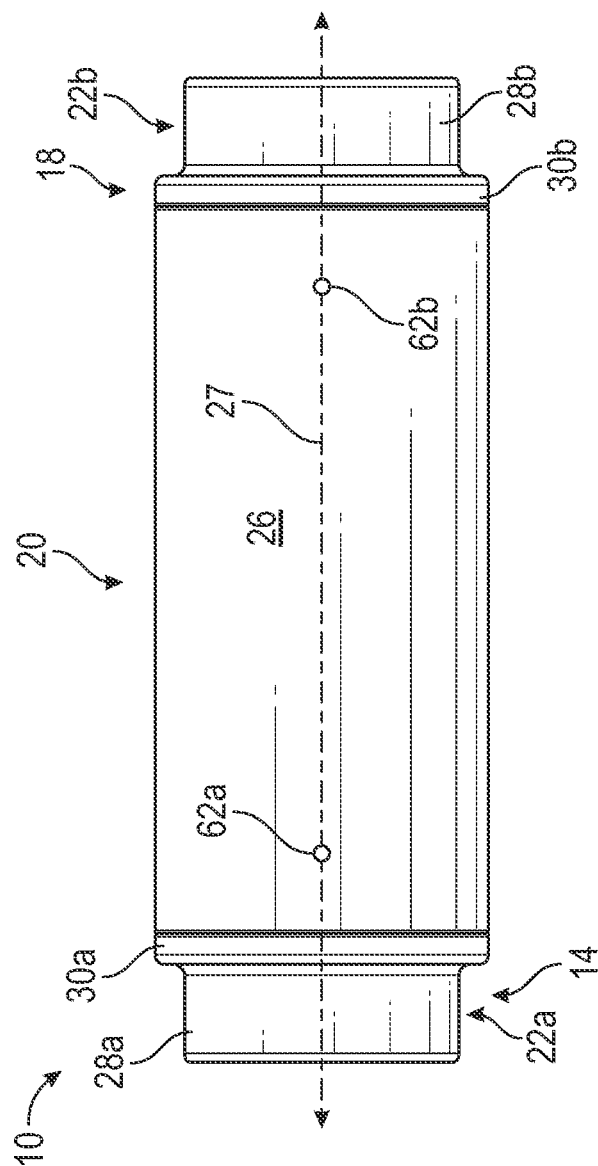
FIG. 2 is a top elevational view of the flow meter assembly of FIG. 1.

As illustrated in FIG. 2, each of the caps 22a, 22b can include first mating portion 28a, 28b. The first mating portions 28a, 28b can be configured to couple with a pipe in an in-line manner. For example, the first mating portions 28a, 28b can each be configured to be inserted into an end of a pipe. Fasteners, welding, adhesives, and/or other connection methods/structures can be used to connect the caps 22a, 22b (e.g., the first mating portions 28a, 28b) to the pipe ends. The caps 22a, 22b can include apertures 32a, 32b (FIG. 4) configured to facilitate fluid flow from the pipes through the housing 26.

Figure 3:
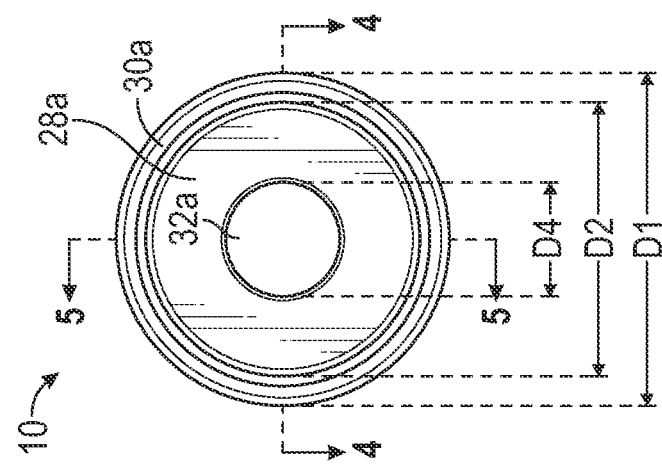
FIG. 3 is a left side elevational view of the flow meter assembly of FIG. 1.

As illustrated in FIGS. 2-3, the caps 22a, 22b can include second portions 30a, 30b. The second portions 30a, 30b have a diameter D1 greater than the diameter D2 of the first mating portions 28a, 28b. The second portions 30a, 30b can be configured to inhibit or prevent over-insertion of the caps 22a, 22b into the pipes and/or into the housing 26. For example, the second portions 30a, 30b can be sized to abut the ends of the pipes and the ends of the housing 26. The first mating portions 28a, 28b can extend from the second portions 30a, 30b.

Figure 4:
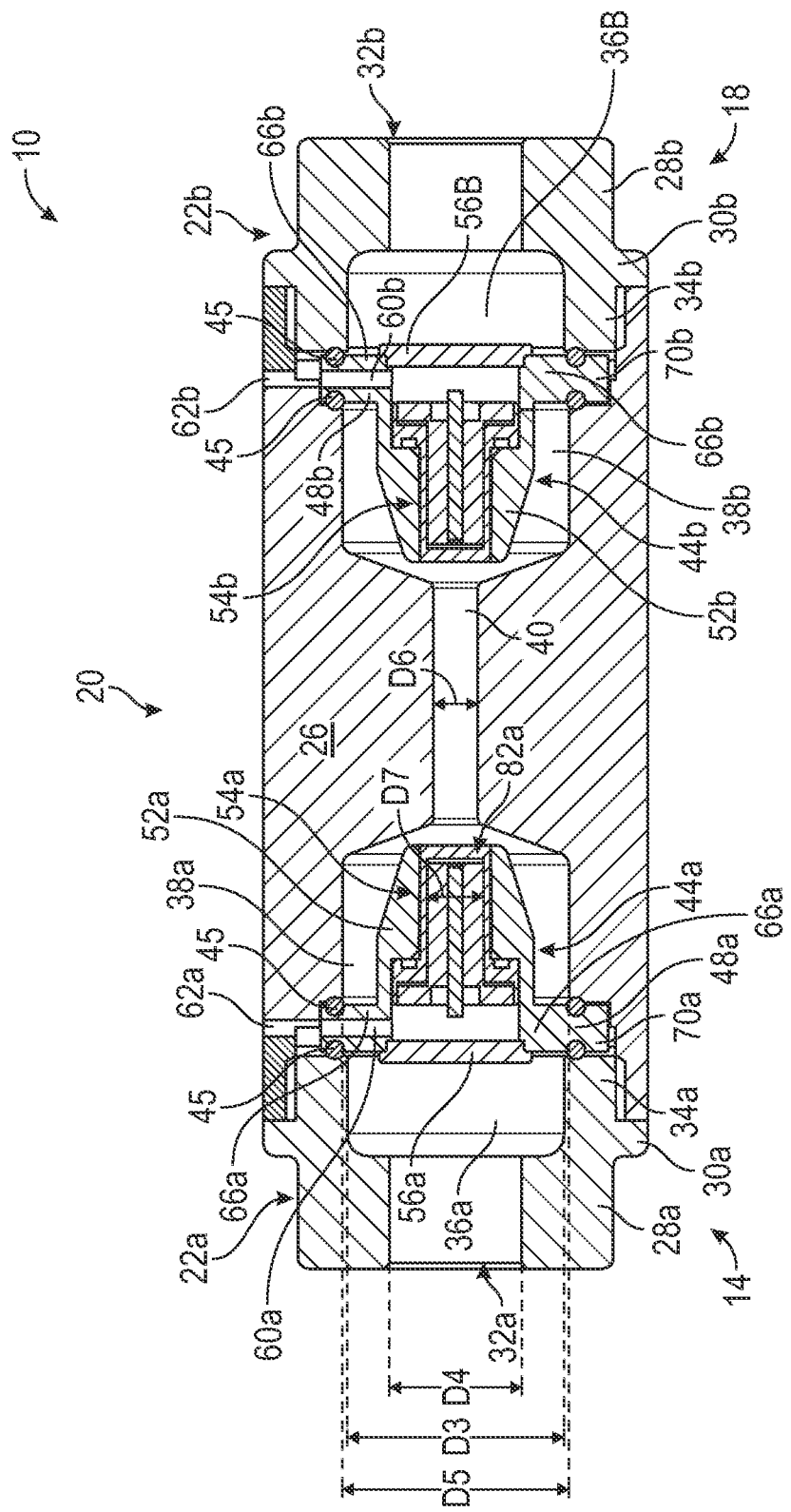
FIG. 4 is a longitudinal cross-section view of the flow meter assembly of FIG. 1, taken along the cut-plane 4-4 of FIG. 3.

Referring to FIG. 4, the caps 22a, 22b can include third portions 34a, 34b. The third portions 34a, 34b can be connected to the second portions 30a, 30b and extend in a direction opposite the first mating portions 28a, 28b. The third portions 34a, 34b can have outer diameters that are sized to fit at least partially within the housing 26. For example, the third portions 34a, 34b can be inserted into the housing 26 when the caps 22a, 22b are mated with the housing 26. The inner diameter D3 of the third portions 34a, 34b can greater than the inner diameter D4 of the apertures 32a, 32b. As illustrated, the inner diameter D3 of the third portions 34a, 34b forms cap chambers 36a, 36b. The cap chamber 36a is in fluid communication with the aperture 32a in the cap 22a and the cap chamber 36b is in fluid communication with the aperture 32b in the opposite cap 22b.

The housing 26 can include one or more housing chambers 38a, 38b. For example, the inner diameter D5 of the housing 26 near the first and second ends 14, 18 of the assembly can define the housing chambers 38a, 38b. The housing chambers 38a, 38b. The inner diameter D5 can be greater than the inner diameter D4 of the apertures 32a, 32b. In some embodiments, the inner diameter D5 defining the housing chambers 38a, 38b can be within ±15%, within ±12%, within ±9%, and/or within ±5% of the inner diameter D3 of the third portions 34a, 34b of the caps 22a, 22b.

Figure 5:
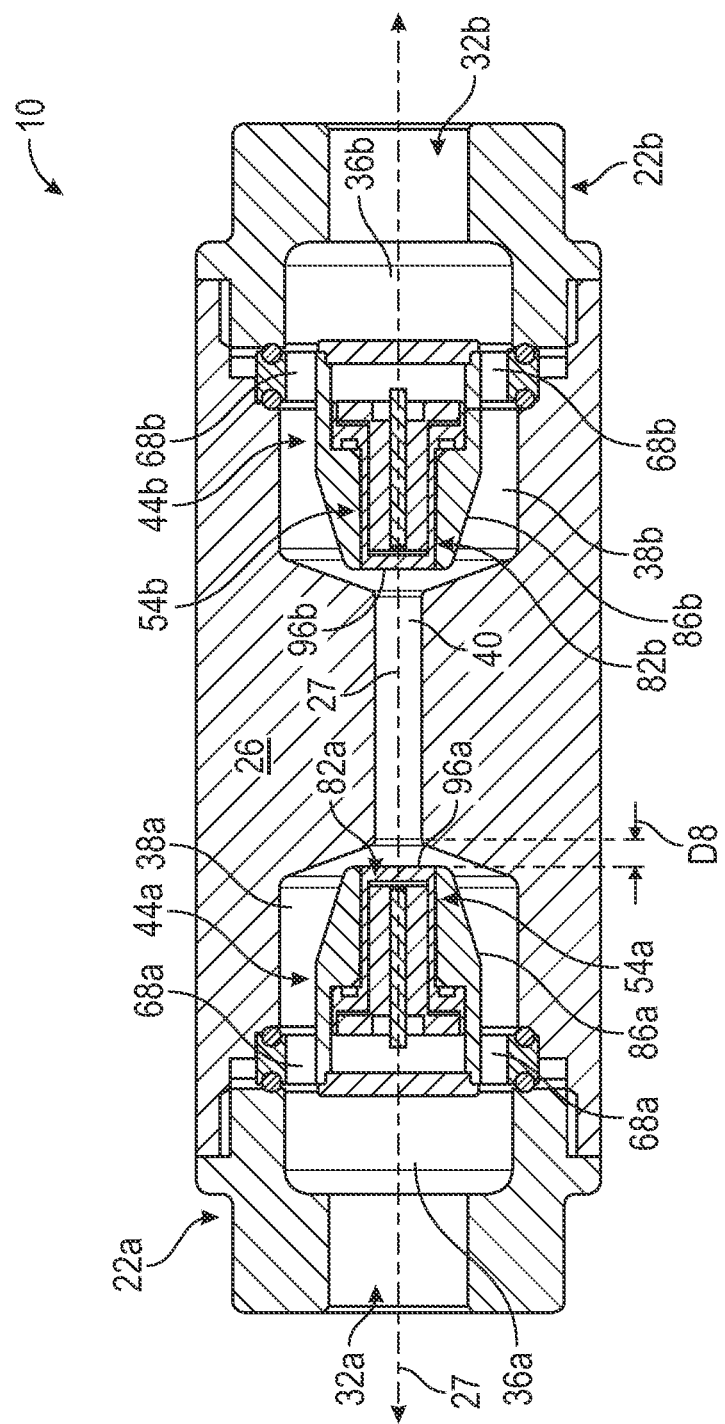
FIG. 5 is a longitudinal cross-section view of the flow meter assembly of FIG. 1, taken along the cut-plane 5-5 of FIG. 3.
Figure 6:
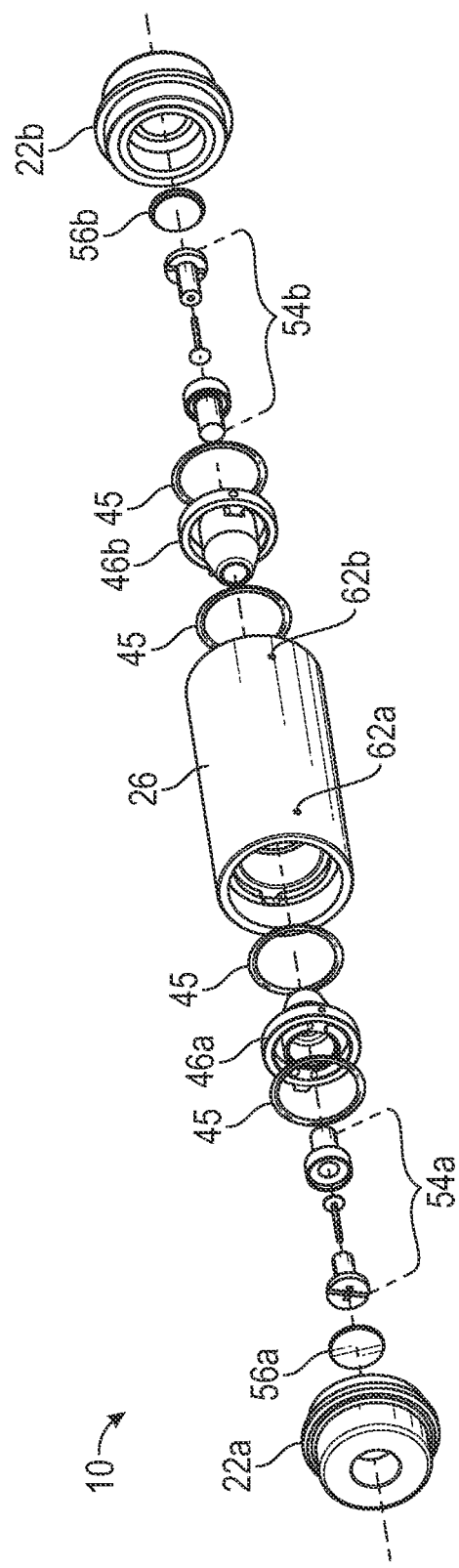
FIG. 6 is an exploded perspective view of the flow meter assembly of FIG. 1.

The housing 26 can include a measurement channel 40. The measurement channel 40 can extend along the housing axis 27 (FIG. 5). In some embodiments, the measurement channel 40 is straight and parallel to the housing axis 27. The measurement channel 40 can have a diameter D6. As illustrated, the measurement channel 40 can have a constant diameter along its length. The diameter D6 of the measurement channel 40 can be less than one or both of the diameters D4, D5 of the cap chambers. In some embodiments, the diameter D6 of the measurement channel 40 is less than ½, less than ⅓, less than ¼, and/or less than ⅕ of the diameter D5 of the housing chambers 38a, 38b. In some applications, the diameter D6 of the measurement channel is less than or equal to 1 inch, less than or equal to 0.75 inches, less than or equal to 0.5 inches, and/or less than or equal to 0.25 inches. For example, the diameter D6 of the measurement channel 40 can be approximately 0.25 inches.

As illustrated in FIGS. 4-5, the flow meter assembly 10 can include one or more sensor assemblies 44a, 44b. The sensor assemblies 44a, 44b can be positioned within one or both of the cap chambers 36a, 36b and housing chambers 38a, 38b. In some embodiments, the sensor assemblies 44a, 44b are positioned outside of and on opposite sides of the measurement channel 40.

The sensor assemblies 44a, 44b can each include an outer cup portion 46a, 46b. The sensor assemblies 44a, 44b can each include a transducer assembly 54a, 54b. The transducer assembly 54a, 54b can be positioned at least partially within the outer cup portion 46a, 46b. The sensor assembly 44a, 44b can include a cap 56a, 56b configured to seal one side of the sensor assembly 44a, 44b and inhibit or prevent ingress of fluid into the sensor assemblies 44a, 44b from the interior of the flow meter assembly 10. The flow meter assembly can include one or more seals 45 (e.g., O-rings) positioned between the sensor assemblies, 44a, 44b and the caps 22a, 22b, and/or housing 26.

In some embodiments, as discussed in more detail below, the sensor assemblies 44a, 44b include an outlet port 60a, 60b configured to facilitate access of wires (not shown) or other components into the sensor assemblies 44a, 44b from outside of the flow meter assembly 10. As illustrated, the outlet ports 60a, 60b can be aligned with housing ports 62a, 62b which extend through the walls of the housing 26. Wires passed through the ports 60a, 60b, 62a, 62b can be connected to controllers, power sources, and/or other electrical components. Isolation of the wires from the fluid flowing through the meter assembly 10 can allow for flow measurements without concern for corrosion of the wires or other components within the sensor assemblies 44a, 44b. Such isolation can allow for flow rate measurement in corrosive chemicals and other fluids. One or more controllers (not shown) may be used to adjust components within the flow meter 10 in response to changes in fluid types, temperatures, and other factors.

Figure 7:
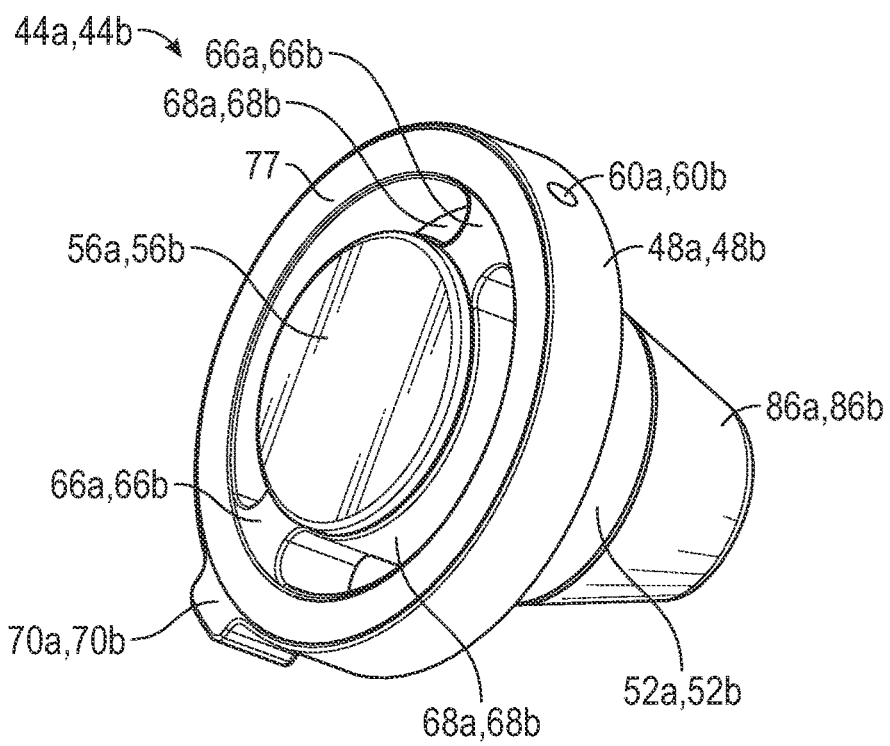
FIG. 7 is a perspective view of a sensor assembly of the flow meter assembly of FIG. 1.
Figure 8:
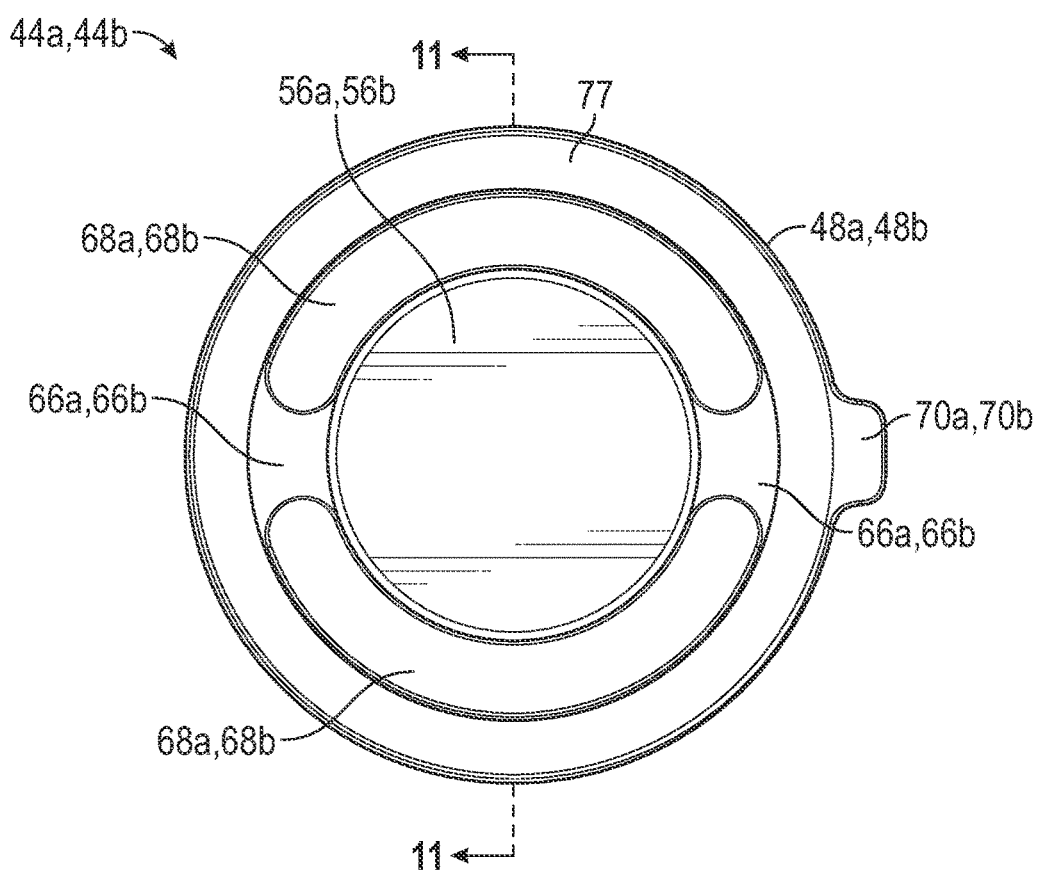
FIG. 8 is a side elevational view of the sensor assembly of FIG. 7.

As illustrated in FIGS. 7-8, the outer cup portion 46a, 46b can include a head portion 48a, 48b. The outer cup portion 46a, 46b can include an elongate portion 52a, 52b. The elongate portion 52a, 52b can be connected to the head portion 48a, 48b and extend therefrom in a direction parallel to the channel axis 27. One or more flow channels 68a, 68b can be formed through the head portion 48a, 48b. The flow channels 68a, 68b can facilitate fluid flow past the sensor assemblies 44a, 44b through the flow meter assembly 10. The flow channels 68a, 68b can be bounded by boundary walls 66a, 66b. The boundary walls 66a, 66b can be curved form rounded ends to the flow channels 68a, 68b, as measured in a plane perpendicular to the channel axis.

The sensor assembly 44a, 44b can include a key feature 70a, 70b (e.g., a protrusion, indentation, or other keying feature). The key feature 70a, 70b can be configured to fit into or onto an alignment feature 72a, 72b (e.g., a protrusion, indentation, or other keying feature) of the housing 26. Interaction between the key feature 70a, 70b and alignment feature 72a, 72b can help to ensure proper alignment between the outlet ports 60a, 60b and the housing ports 62a, 62b. The head portion 48a, 48b can include one or more seal channels 77 configured to receive and/or align the seal(s) 45.

Figure 9:
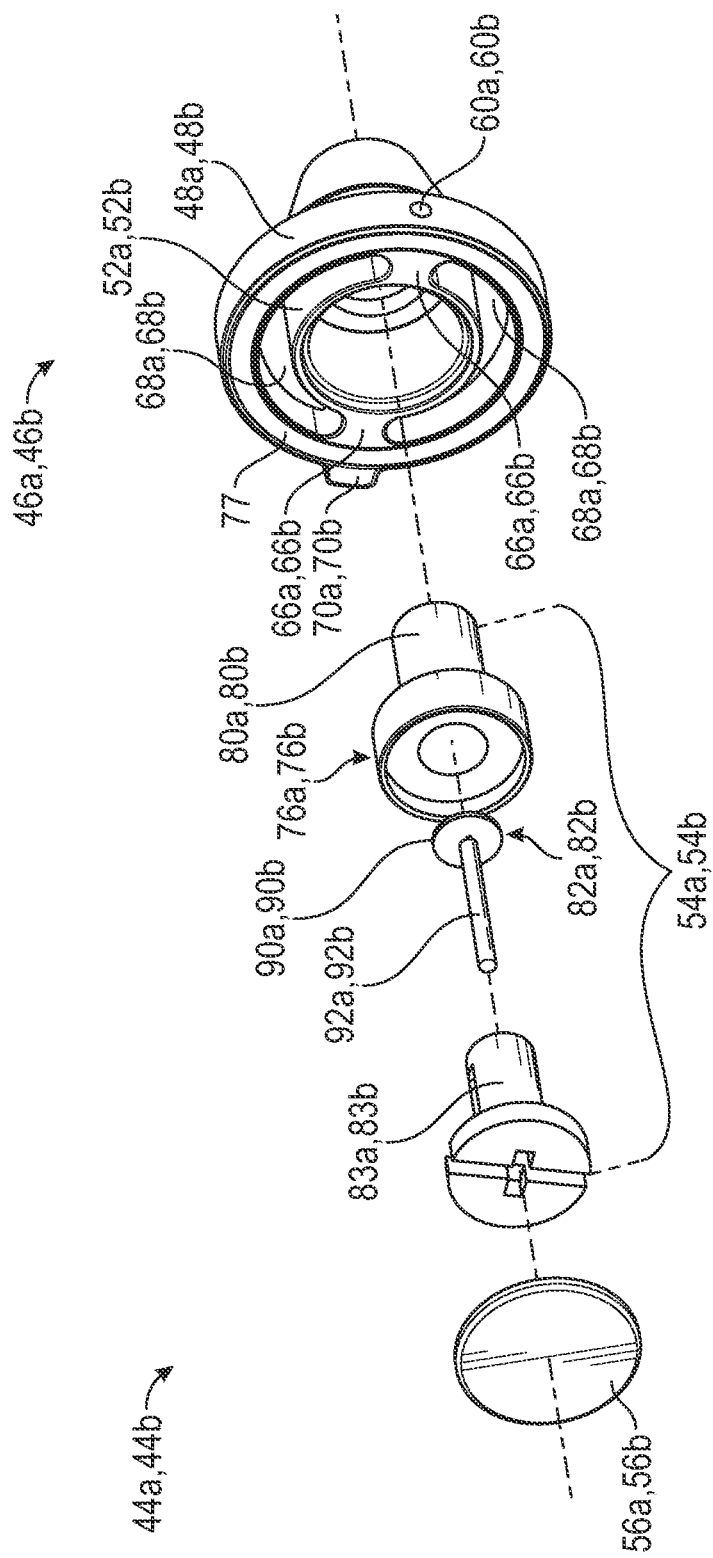
FIG. 9 is an exploded back side perspective view of the sensor assembly of FIG. 7.
Figure 10:
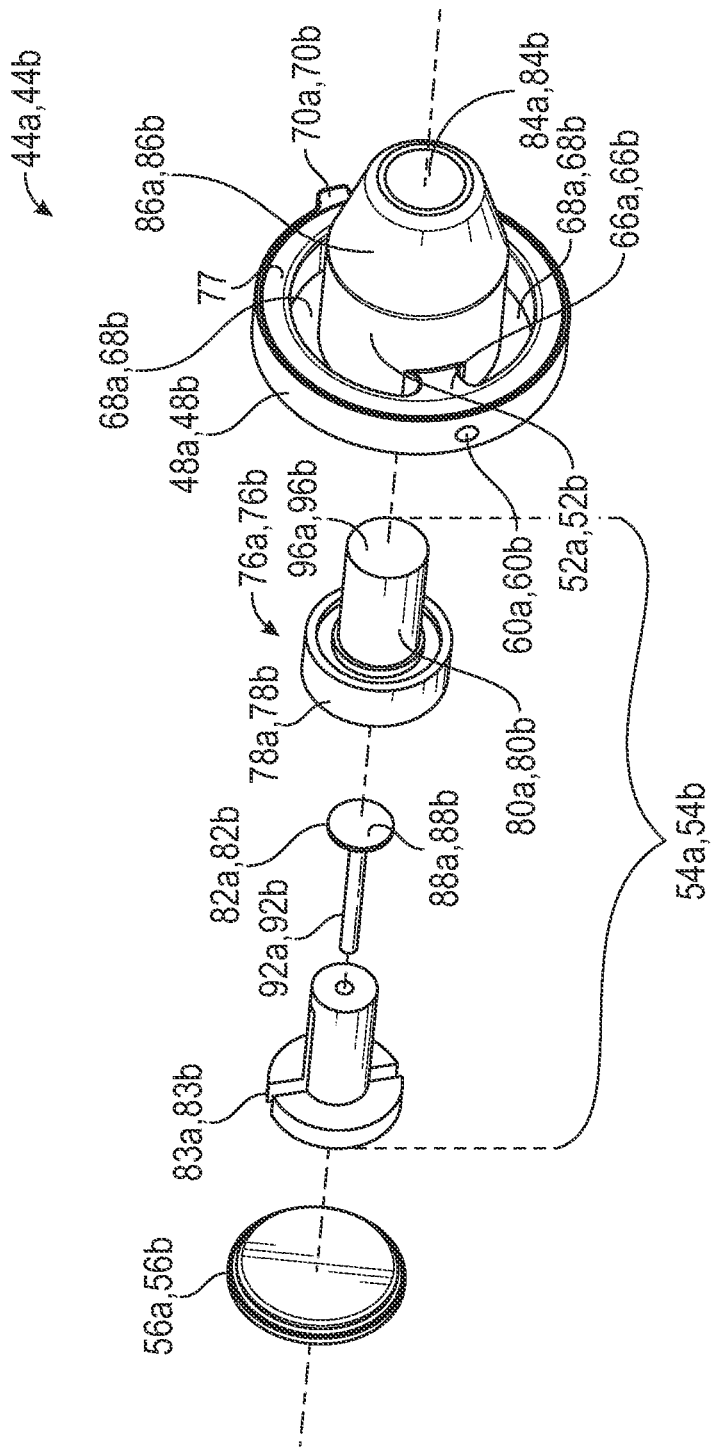
FIG. 10 is an exploded front side perspective view of the sensor assembly of FIG. 7.

Referring to FIGS. 9-10, the transducer assembly 54a, 54b can include an inner cup portion 76a, 76b. The inner cup portion 76a, 76b can be configured to house and/or receive a transducer 82a, 82b. In some embodiments, a transducer backing 83a, 83b can be positioned within the inner cup portion 76a, 76b behind the transducer 82a, 82b. In some embodiments, the backing 83a, 83b is an elastomer, epoxy, or other material configured to inhibit transmission of ultrasonic signals from the transducers 82a, 82b through the backing 83a, 83b.

As illustrated in FIG. 4, the transducer 82a, 82b can have a width or diameter D7. The diameter D7 of the transducer can be greater than the diameter D6 of the measurement channel 40. For example, the diameter D6 of the transducer 82a, 82b can be at least 5% greater, at least 8% greater, at least 12% greater, at least 25% greater, at least 35% greater, at least 50% greater, and/or at least 100% greater than the diameter D6 of the measurement channel 40. In some embodiments, the diameter D7 of the transducer 82a, 82b is at least 0.1 inches, at least 0.2 inches, at least 0.25 inches, at least 0.3 inches, at least 0.4 inches, at least 0.75 inches, and/or at least 1 inch. For example, the diameter D7 of the transducer 82a, 82b can be approximately 0.375 inches.

Referring back to FIGS. 9-10, the inner cup portion 76a, 76b can include a head portion 78a, 78b. The inner cup portion 76a, 76b can include an elongate portion 80a, 80b connected to and extending from the head portion 78a, 78b. The transducer 82a, 82b can be positioned within the elongate portion 80a, 80b at or near the end of the elongate portion 80a, 80b opposite the head portion 78a, 78b.

The head portion 78a, 78b of the inner cup portion 76a, 76b can be configured to engage with a portion of the elongate portion 52a, 52b. In some embodiments, the head portion 78a, 78b of the inner cup portion 76a, 76b is welded, adhered, or otherwise connected to the elongate portion 52a, 52b or some other portion of the sensor assembly 44a, 44b.

The elongate portion 52a, 52b can include a channel 84a, 84b. The channel 84a, 84b can extend through the entirety of the elongate portion 52a, 52b. In some embodiments, one end of the channel 84a, 84b is closed (e.g., the end facing the opposite sensor assembly 44a, 44b). The channel 84a, 84b can be sized and shaped to receive the elongate portion 80a, 80b of the inner cup portion 76a, 76b.

Figure 11:
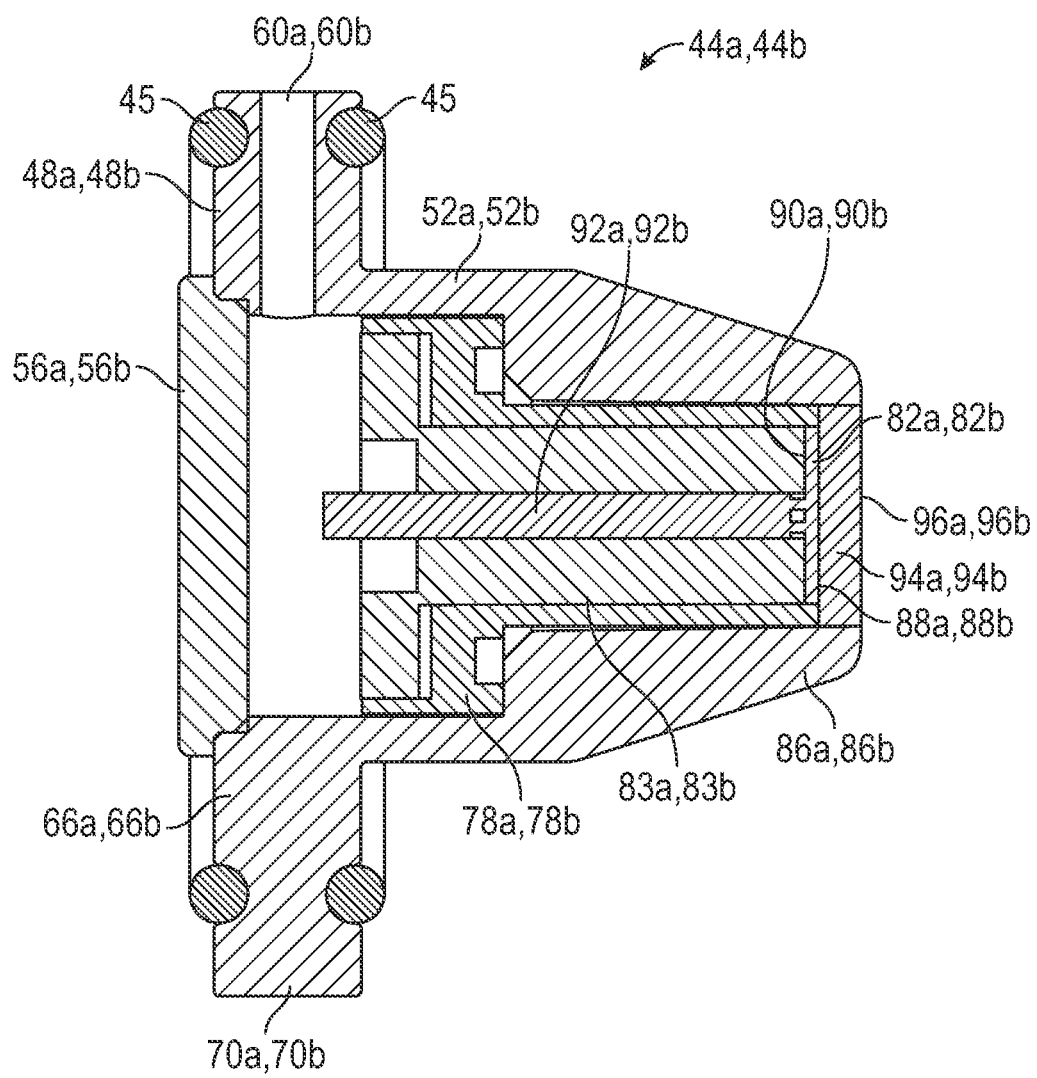
FIG. 11 is a longitudinal cross-section view of the sensor assembly of FIG. 7, taken along the cut-plane C-C of FIG. 8.

As illustrated in FIG. 11, the elongate portion 52a, 52b can have a tapered end 86a, 86b (e.g., the end closest to the opposite sensor assembly 44a, 44b). In some embodiments, the elongate portion 52a, 52b has an overall "bullet" shape. When assembled, the transducer 82a, 82b can be positioned at or near the end of the elongate portion 52a, 52b (e.g., the tapered end) opposite the head 48a, 48b. In some embodiments, this end of the elongate portion 52a, 52b has the smallest diameter of any portion of the elongate portion 52a, 52b.

The transducer 82a, 82b can have an overall flat shape. For example, the transducer 82a, 82b can have a disc shape with a front side 88a, 88b and a back side 90a, 90b. The front side 88a, 88b of the transducer 82a, 82b can be the side facing the transducer 72a, 72b on the other end of the housing 26. The respective front sides 88a, 88b can be parallel to each other and can be positioned along the housing axis 27. Such alignment can facilitate successful transmission of ultrasonic signals between the two transducers 82a, 82b. In some embodiments, a wire conduit 92a, 92b is connected to the back side 90a, 90b of the transducer 82a, 82b. The wire conduit 92a, 92b can help guide electrical wires away from the transducer 82a, 82b and toward the outlet port 60a, 60b when the sensor assembly 44a, 44b is assembled.

The transducer 82a, 872b can be positioned along the housing axis 27. The width (e.g., diameter) of the transducer 82a, 82b can be greater than the diameter D6 of the measurement channel 40. The transducer 82a, 82b can be positioned behind a portion of the inner cup portion 76a, 76b through which the transducer 82a, 82b. For example, the inner cup portion 76a, 76b can include a wave guide portion 94a, 94b. The wave guide portion 94a, 94b can be on the end of the inner cup portion 76a, 76b closest the measurement channel 40. The wave guide portion 94a, 94b can have a wave guide face 96a, 96b facing toward the wave guide face 96a, 96b of the opposite sensor assembly 44a, 44b. The wave guide faces 96a, 96b can be flat and positioned along the housing axis to facilitate direction of the transducer signals parallel to the housing axis 27. The wave guide faces 96a, 96b can be parallel to each other. In some embodiments, the wave guide faces 96a, 96b have a concave configuration to focus the transducer signals inward toward the housing axis 27. In some embodiments, the wave guide 96a, 96b has a convex shape to direct the ultrasonic waves outward toward the walls of the measurement channel 40.

As illustrated in FIG. 5, the wave guide faces 96a, 96b can be positioned close to the ends of the measurement channel 40 as measured parallel to the housing axis 27. In some embodiments, distance D8 between the wave guide faces 96a, 96b and the ends of the measurement channel 40 are less than 2 inches, less than 1.5 inches, less than 1 inch, less than 0.75 inches, less than 0.55 inches, less than 0.3 inches, and/or less than 0.1 inches, as measured parallel to the housing axis 27. In some embodiments, the distance D8 between the wave guide faces 96a, 96b and the measurement channel 40 is approximately 0.22 inches, as measured parallel to the housing axis 27. Maintaining a close distance between the wave guide faces 96a, 96b and the ends of the measurement channel 40 can increase the quality of the measurements obtainable by the transducers 82a, 82b. For example, maintaining a close distance can reduce the turbulence in the flow by maintaining a smooth flow path between the flow channels 68a, 68b and the measurement channel 40. This flow path can transition with relatively little or no diffusion from the flow channels 68a, 68b and the measurement channel 40. Reducing turbulence in the flow between the wave guide faces 96a, 96b and the measurement channel 40 can reduce the noise in the signal measured by the transducers 82a, 82b. In some embodiments, flow rates as low as 15 mL/min, as low as 10 mL/min, and/or as low as 5 mL/min can be measured.

The ratio between the distance D8 and the diameter D7 of the transducer 82a, 82b can be less than 2:1, less than 3:2, less than 4:3, less than 7:8, less than 3:4, less than 1:2, and/or less than 1:4. In some embodiments, the ratio between the distance D8 and the diameter D7 of the transducer 82a, 82b is approximately 3:5. The ratio between the distance D8 and the diameter D6 of the measurement channel 40 can be less than 2:1, less than 5:4, less than 6:5, less than 8:9, less than 1:2, less than 1:3, and/or less than 1:4. In some embodiments, the ratio between the distance D8 and the diameter D6 of the measurement channel 40 is approximately 9:10. Maintaining close ratios between the distance D8 and the diameters D6 and D7 can help to maintain a smooth flow at the entrance and exit of the measurement channel 40. Maintaining smooth flow (e.g., low turbulence) can reduce the noise in the signal measured by the transducers 82a, 82b and can allow for measurement of small flow rates.

Figure 12:
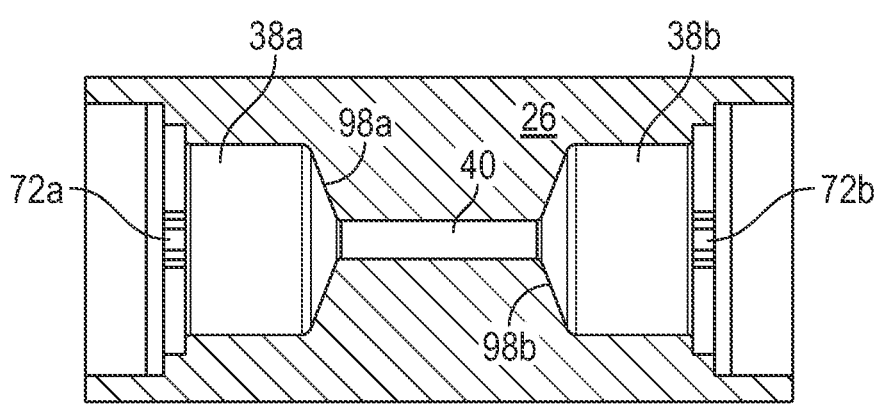
FIG. 12 is a longitudinal cross-section view of a meter housing of the flow meter assembly of FIG. 1, taken along the cut-plane 5-5 of FIG. 3.

Referring to FIG. 12, the housing chamber 38a, 38b on either end of the housing 26 can have a tapered portion 98a, 98b. The tapered portion 98a, 98b can extend to the measurement channel 40.

Referring back to FIG. 5, the flow meter assembly 10 can be symmetric about a plane (not shown) perpendicular to the housing axis 27 and positioned halfway along the length of the housing 26. Each of the cap apertures 32a, 32b, transducers 82a, 82b, and measurement channel 40 can be positioned along the housing axis 27 to facilitate a substantially straight fluid flow path through the flow meter assembly 10.

Either of the cap apertures 32a, 32b can function as an inlet to the flow meter assembly 10, while the opposite cap aperture 32a, 32b serves as the outlet to the flow meter assembly 10. For the purposes of discussion, the cap aperture 32a on first end 14 will be referred to as the inlet, while the cap aperture 32b on the second end 18 will be referred to as the outlet. Using inlets and outlets that are coaxial or otherwise aligned with the fluid flow path through the assembly 10 can reduce introduction of turbulence that would otherwise occur if lateral or oblique inlets/outlets were used.

Fluid (e.g., a liquid) that flows through the inlet 32a passes into the cap chamber 36a. The cap chamber 36a can have filleted and/or chamfered internal surfaces to provide a smooth fluid flow surface. Providing a smooth flow surface can inhibit bubble generation within the fluid. The fluid in the cap chamber 36a is directed through the flow channels 68a of the sensor assembly 44a into the housing chamber 38a. The boundary walls 66a can reduce turbulence and/or straighten the fluid flow through the system. For example, the boundary walls 66a can inhibit vertical fluid flow through the channels 68a. The flow stabilization provided by the boundary walls 66a, 66b can permit positioning of the flow meter assembly 10 closer to a bend in a piping system than may have been possible without the boundary walls 66a, 66b. The fluid then passes between the tapered end 86a of the elongate portion 52a and the tapered portion 98a of the housing chamber 38a. The fluid is accelerated into the measurement channel 40.

The flow rate of the fluid is measured by the transducers 82a, 82b as the fluid flows through the measurement channel 40. Each of the transducers 82a, 82b can send and receive ultrasonic signals when measuring flow rate through the measurement channel 40. The fluid then passes between the tapered end 86b of the elongate portion 52b and the tapered portion 98b of the housing chamber 38b. After passing through the housing chamber 38b, the fluid is directed through the channels 68b of the sensor assembly 44b and into the cap chamber 36b. The fluid then passes out through the outlet 32b and into the pipe with which the cap 22b is mated.

Utilizing a narrow measurement channel 40 (e.g., a channel narrower than the transducers 82a, 82b) can facilitate accurate and reliable measurement of very low liquid flow rates. For example, a flow meter assembly 10 as described in the present disclosure can measure flow rates as low as 15 mL/min, as low as 10 mL/min, and/or as low as 5 mL/min. Accurately measuring low flow rates such as those recited above can be especially beneficial in applications where chemicals or other components need to be added to another fluid at a reliably low level (e.g., due to safety considerations). This is often needed in small municipalities, individual homes, and other small scale water treatment and/or water deliver environments.

Another advantage provided by the flow meter assembly 10 is the ability to measure fluid velocity without needing to reflect ultrasonic signals off of the walls of the housing 26 or of any other component in the system. For example, flow meters which measure reflected signals must precisely align and position the transducers to ensure that the signals from each transducer will be received by the other transducer. Such alignment challenges in reflected-signal systems can be further exacerbated when the temperature and/or composition of the fluid changes, as these changes can require repositioning/realignment of one or both of the transducers. Further, imperfections, corrosion, sediment, and/or other abnormalities on the surface of the pipe walls can adversely affect the accuracy of reflected signals. Signal strength can also suffer when the ultrasonic signals are reflected due to phenomena such as dispersion of the signal and absorption of a portion of the signal by the reflecting surface. The above-recited challenges associated with reflected-signal systems can be avoided by the flow meter 10, as the ultrasonic signals generated by the transducers 82a, 82b are sent directly to the opposite transducer without reflection.

In some embodiments, one or more of the components within the caps 22a, 22b and/or housing 26 may be removed for cleaning, repair, or other maintenance. For example, one of the caps 22a, 22b may be disconnected from the housing 26, allowing a user access to the sensor assembly 44a, 44b.

FIGS. 13-21 illustrate an embodiment of a flow meter assembly 110. The flow meter assembly 110 includes some structures and functions that are the same as or similar to the structures and functions described above with respect to the flow meter assembly 10. Components of the flow meter 110 that are similar or the same in structure and/or function as the components of the flow meter 10 are labeled with a like reference number, wherein a value of "100" is added. For example, the wave guide faces 196a, 196b of the flow meter 110 are similar in structure and function as the wave guide faces 96a, 96b of the flow meter 10. Unless otherwise noted below, the like components of the flow meter 110 are the same as or similar in structure and/or function as the like elements of the flow meter 10.

Figure 13:
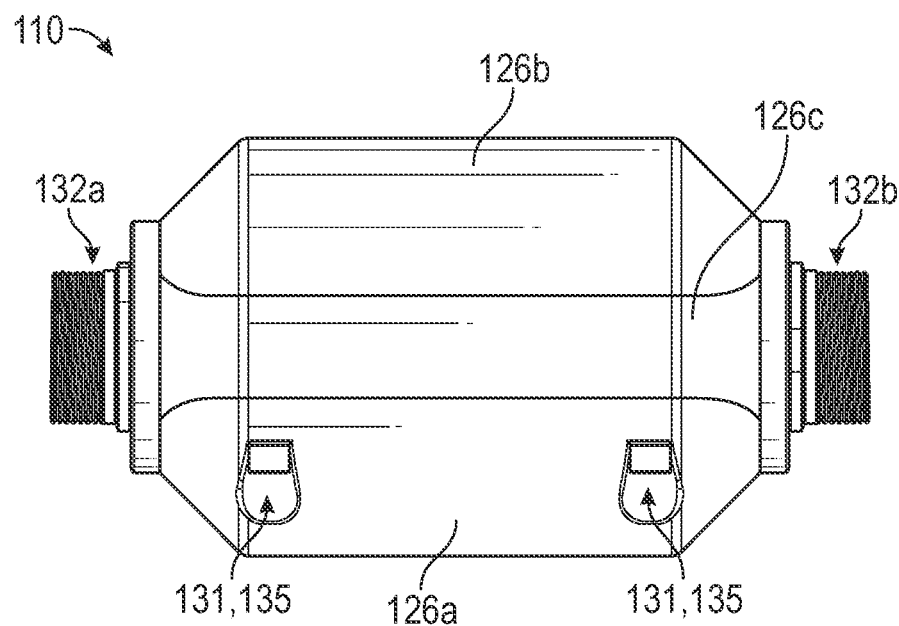
FIG. 13 is a top plan view of another embodiment of a flow meter assembly.
Figure 14:
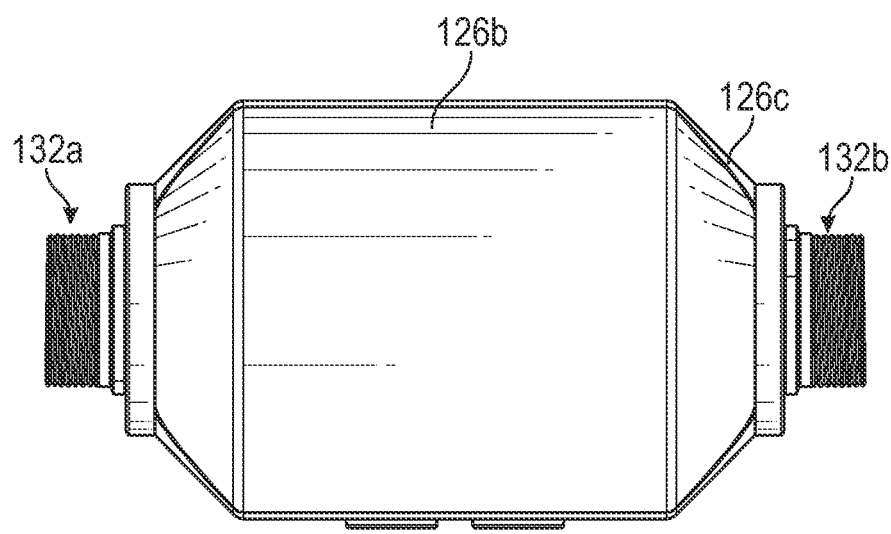
FIG. 14 is a rear plan view of the flow meter assembly of FIG. 13.
Figure 15:
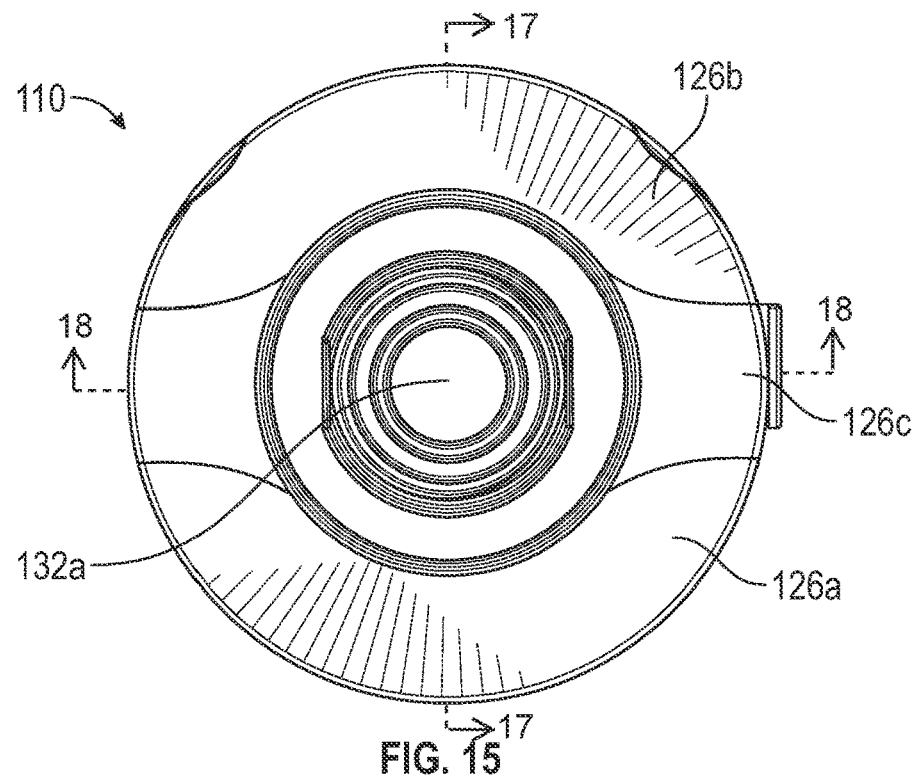
FIG. 15 is a right-side plan view of the flow meter assembly of FIG. 13.

As illustrated in FIGS. 13-15, the flow meter assembly 110 can include a plurality of housing components. For example, the flow meter assembly 110 can include a first housing portion 126a, and a second housing portion 126b. The first and second housing portions 126a, 126b can be similar in structure to each other and can be mirrored about the longitudinal axis of the assembly 110. In some embodiments, one or both of the first and second housing portions 126a, 126b can include apertures 135 though which fasteners 131 or other components can be inserted. The fasteners 131 (FIG. 16) can be configured to hold the first and second housing portions 126a, 126b together when assembled.

Figure 16:
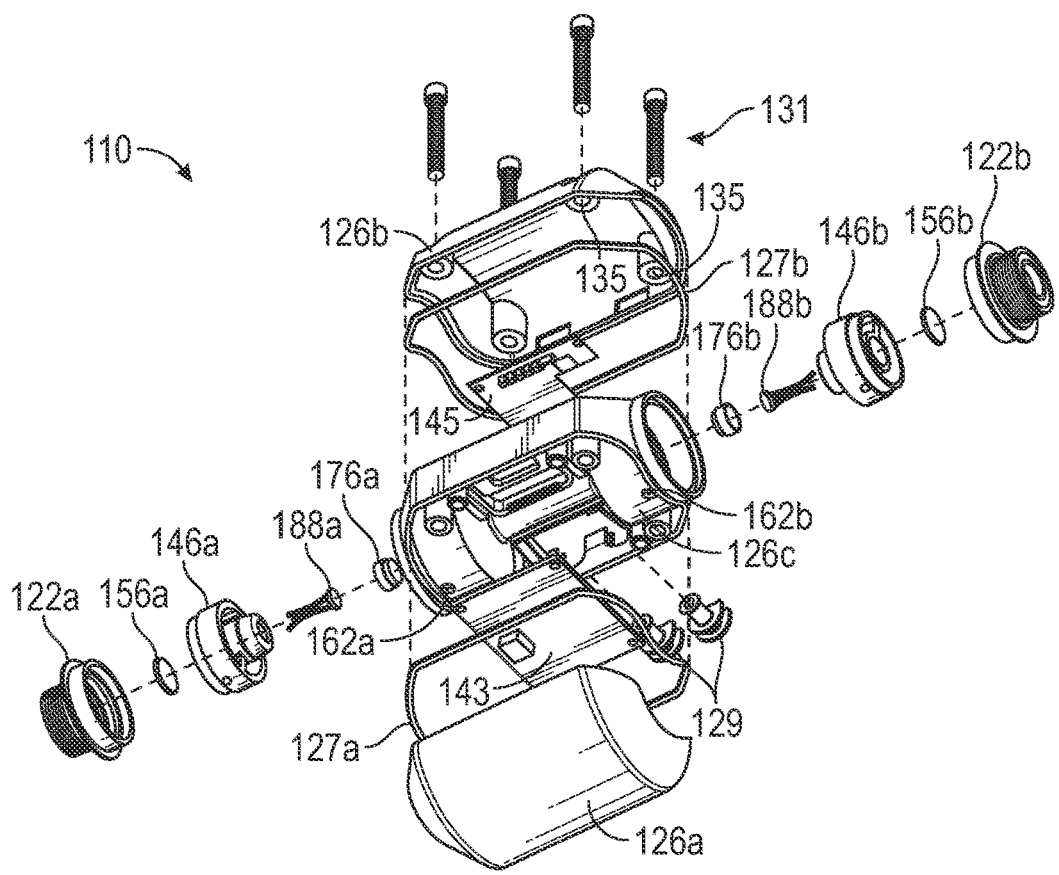
FIG. 16 is a perspective exploded view of the flow meter assembly of FIG. 13.

The flow meter assembly 110 can include a third or inner housing portion 126c. The third housing portion 126c can be positioned at least partially between the first and second housing portions 126a, 126b. In some embodiments, a housing interior 123 (FIG. 17) is formed between the third housing portion 126c and the first and second housing portions 126a, 126b. The fasteners 131 can be configured to pass through at least a portion of the third housing 126c to secure the third housing 126c to and/or between the As illustrated in FIG. 16, the assembly 110 can include one or more seals 127a, 127b. The seals 127a, 127b can be positioned between two or more of the housing portions 126a, 126b, 126c (collectively "126") to seal the housing interior 123. In some embodiments, the seals 127a, 127b are shaped and sized to match one or more surfaces of the housing portions 126. The seals 127a, 127b can be configured to seal the interface between the third housing portion 126c and the first housing portion 126a, and the interface between the third housing portion 126c and the second housing portion 126b, respectively.

One or more electrical components (e.g., circuit boards, controllers, wireless or wired transmitters, batteries, sensors, memory units, processors, etc.) can be positioned at least partially within the housing interior 123. As illustrated, electrical components 143, 145 can be positioned on one or both sides of the third housing portions 126c. Grommets 129 or other sealing structures can be used to facilitate passage of wires and/or cables from an exterior of the housing portions 126 to the housing interior 123. In some embodiments, the assembly 110 is completely wireless and without holes or other access structures into the housing interior 123 when the assembly 110 is assembled.

In some embodiments, two or more components of the assembly 110 are connected to each other via spin welding. For example, the caps 122a, 122b can be spin welded to the outer cup portions 146a, 146b of the sensor assemblies 144a, 144b. In some embodiments, the outer cup portions 146a, 146b are spin welded to the third housing 126c. Spin welding the components to each other can realize a number of benefits. For example, the spin welding process can create a chemical bond between the welded components that can reduce or eliminate the need for using separate O-rings or other sealing structures. This can increase the life of the assembly 110 and reduce the need to replace the seals over time. In some configurations, as illustrated in FIG. 17, the voids 167 are formed in various portions of the assembly 110 to capture material (e.g., flakes, chips, or other material) generated during the spin welding process.

Figure 17:
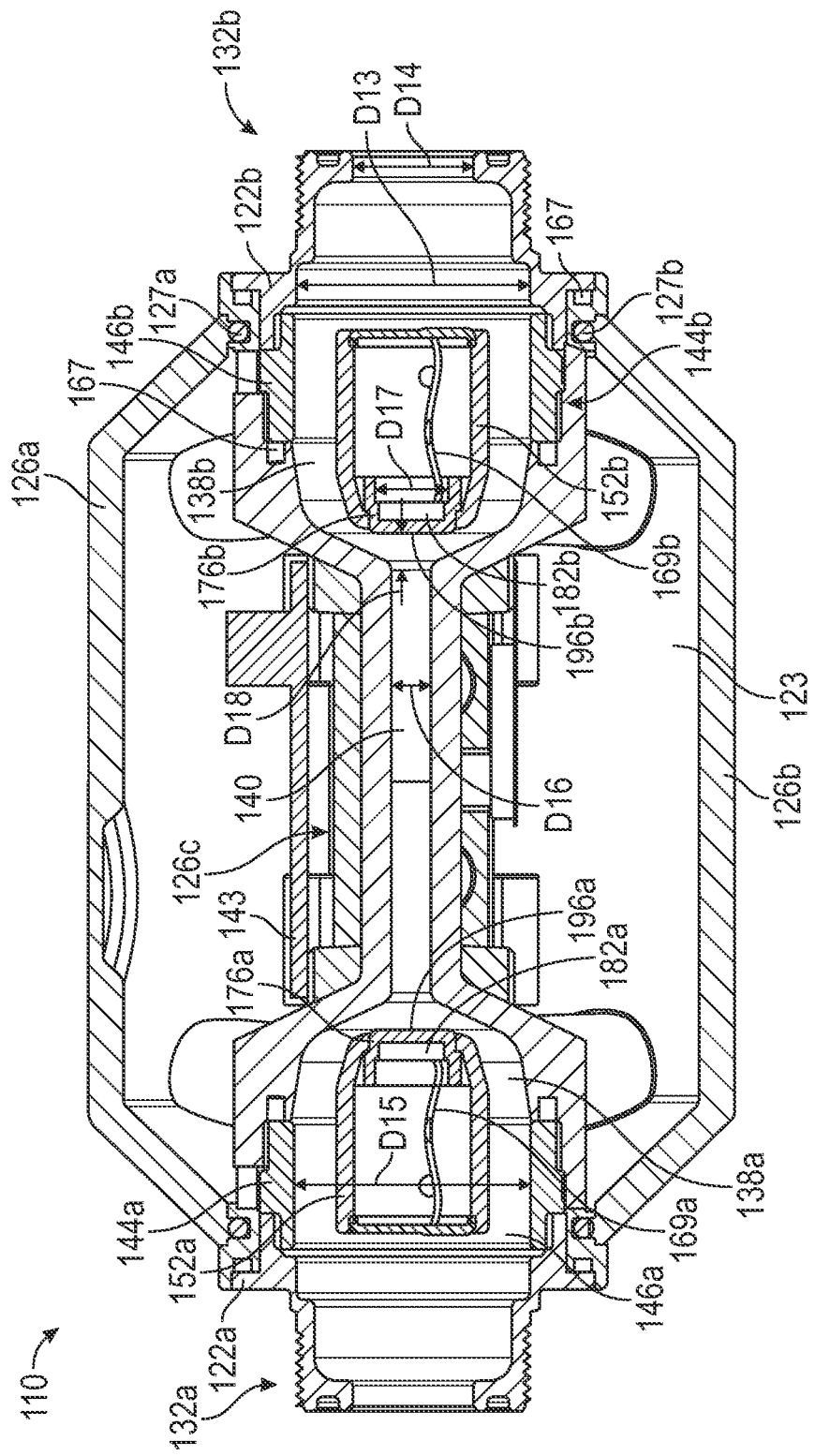
FIG. 17 is a longitudinal cross-section view of the flow meter assembly of FIG. 13, taken along the cut-plane 17-17 of FIG. 15.

Preferably, the various marked distances and diameters in FIG. 17 are the same as or similar to the distances and diameters described above with respect to FIGS. 4 and 5. For example, widths/diameters D13, D14, D15, D16, and D17 can be the same as or similar to the widths/diameters D3, D4, D5, D6, and D7, respectively. The distance D18 can be the same as or similar to the distance D8. As illustrated in FIG. 17, the wave guide faces 196a, 196b can extend beyond the inner cup portions 176a, 176, respectively, in a direction toward the measurement channel 40. This extension can create a step between the wave guide faces 196a, 196b and the inner cup portions 176a, 176 to inhibit or prevent formation of bubbles on wave guide faces 196a, 196b. The respective ratios between the distances and widths/diameters in the assembly 110 can be the same as or similar to those distances and widths/diameters described above with respect to assembly 10.

Figure 18:
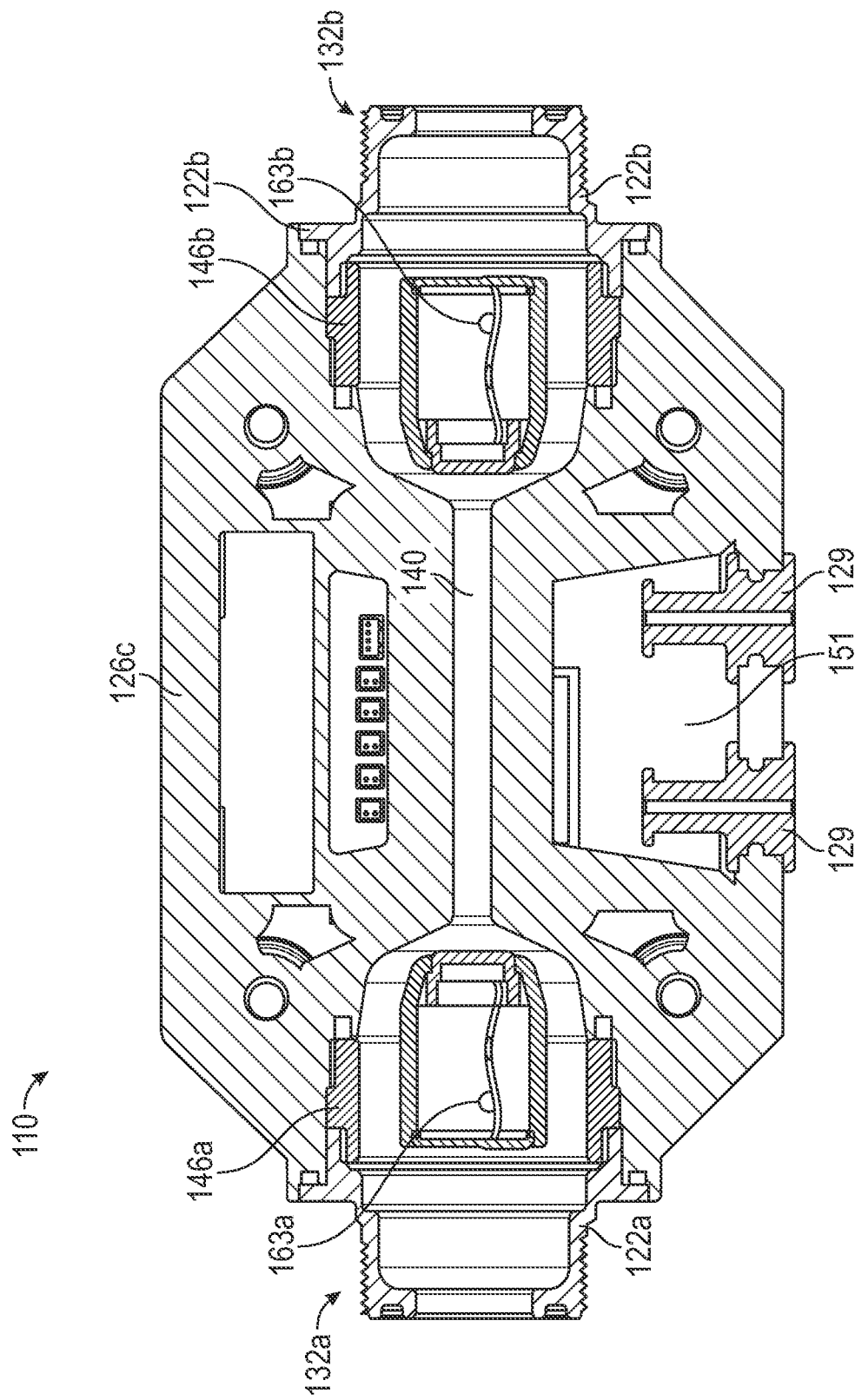
FIG. 18 is a longitudinal cross-section view of the flow meter assembly of FIG. 13, taken along the cut-plane 18-18 of FIG. 15.
Figure 19:
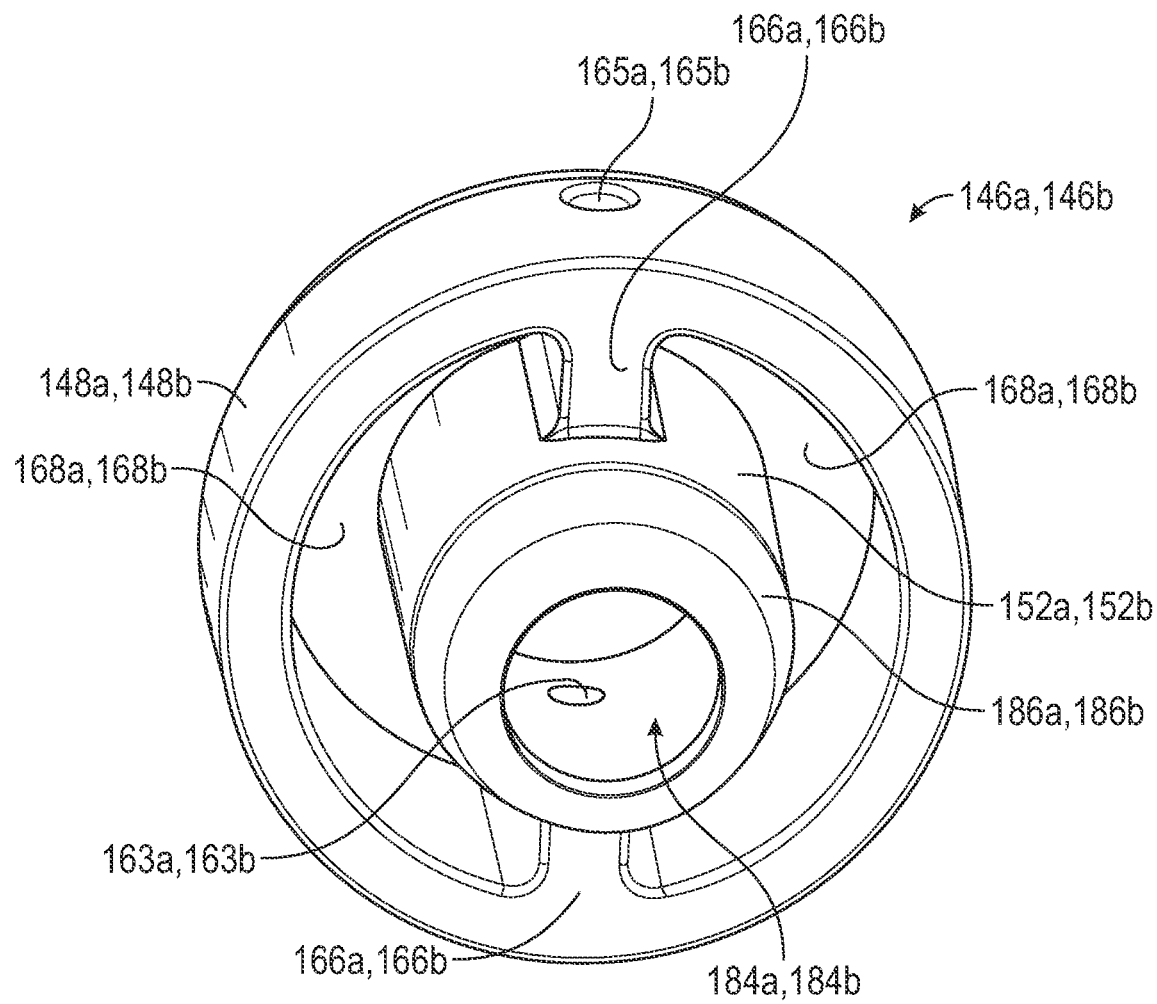
FIG. 19 is a perspective view of an outer cup portion of the flow meter assembly of FIG. 13.
Figure 20:
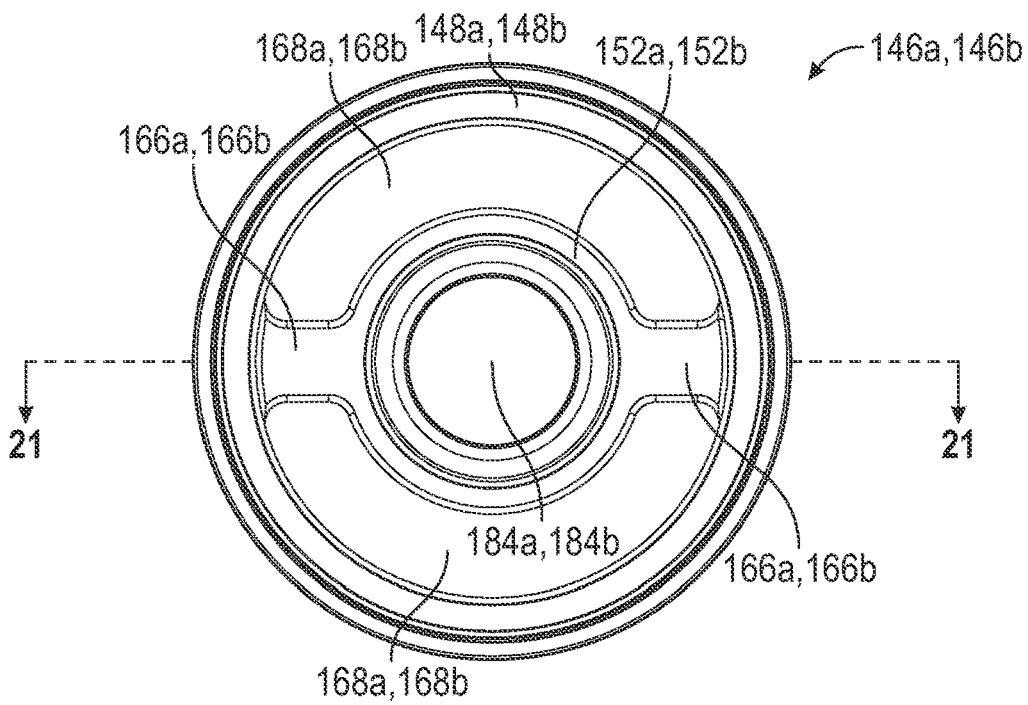
FIG. 20 is an end plan view of the outer cup portion of FIG. 19.

As illustrated in FIGS. 17 and 18, the inner walls of the housing chambers 138a, 138b can have the same or similar slopes/tapers as the elongate portions 152a, 152b of the outer cup portions 146a, 146b. Utilizing similar shapes, curves, and/or tapers between the inner walls of the housing chambers and the outer walls of the elongate portions can reduce turbulence in the flow of fluid through the system, as instances of nuzzling and diffusing can be reduced.

Figure 21:
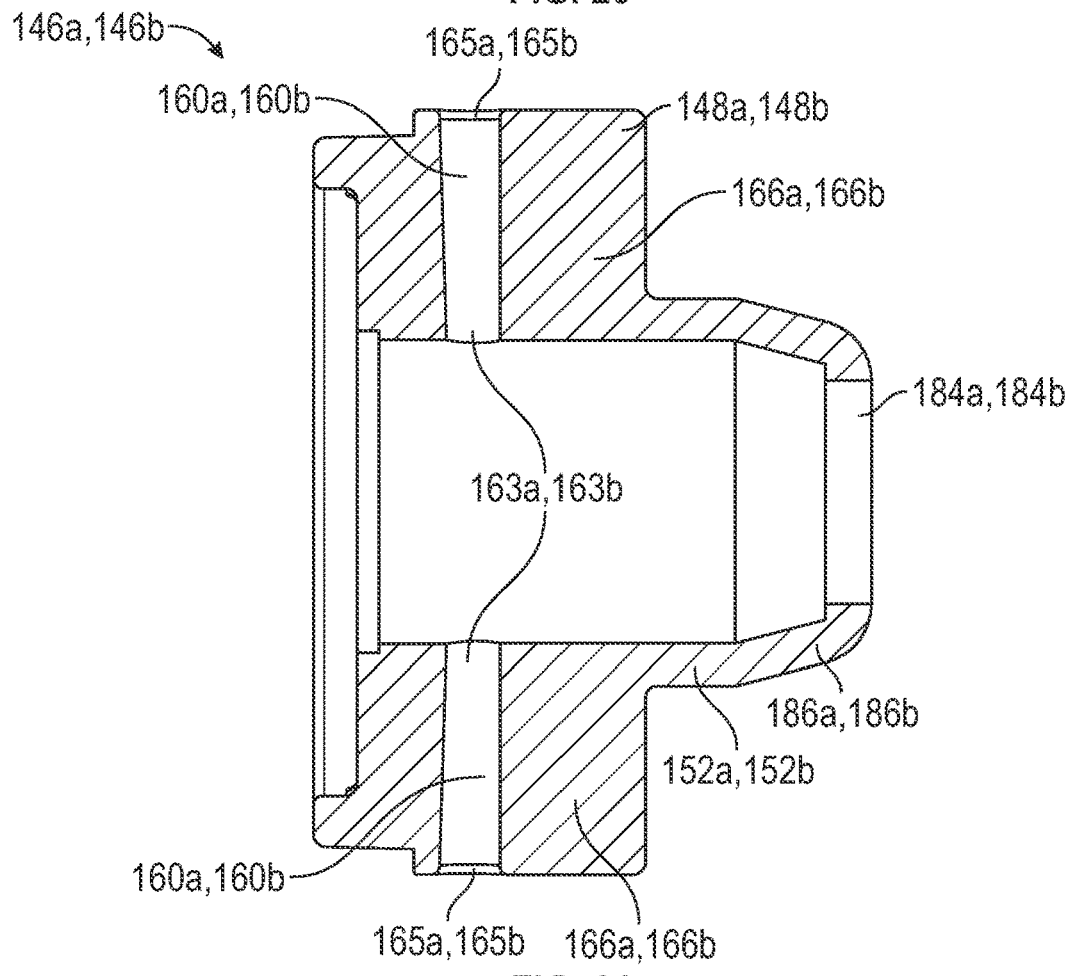
FIG. 21 is a cross-section view of the outer cup portion of FIG. 19, taken along the cut-plane 21-21 of FIG. 20.

As illustrated in FIGS. 16-21, the outer cup portions 146a, 146b and third housing 126c can include one or more ports or channels through which wires or cables can be inserted into an interior of the elongate portions 152a, 152b of the outer cup portions 146a, 146b. As illustrated in FIG. 21, outlet channels 160a, 160b can extend through the boundary walls 166a, 166b of the outer cup portion 146a, 146b. The outlet channels 160a, 160b can have inner ports 163a, 163b and outer ports 165a, 165b. The outlet channels 160a, 160b can be aligned with housing ports 162a, 162b to facilitate passage of wires (e.g., the wires 169a, 169b of FIG. 17) into the interiors of the elongate portions 152a, 152b.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

While the preferred embodiments of the present inventions have been described above, it should be understood that they have been presented by way of example only, and not of limitation. It will be apparent to persons skilled in the relevant art that various changes in form and detail can be made therein without departing from the spirit and scope of the inventions. Thus the present inventions should not be limited by the above-described exemplary embodiments, but should be defined only in accordance with the following claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

What is claimed is:

1. A flow rate assembly comprising:
    a housing having:
        a housing axis;
        a first end having an inlet positioned along the housing axis;
        a second end having an outlet positioned along the housing axis; and
        a measurement channel extending along the housing axis and through a portion of the housing between the first and second ends of the housing, the measurement channel having a width perpendicular to the housing axis;
    a first outer cup portion positioned at least partly within the housing, the first outer cup portion comprising:
        a head portion connected to a wall of the housing;
        an elongate portion connected to the head portion, the elongate portion having a first face facing the measurement channel; and
        a plurality of flow channels through the head portion configured to permit fluid to flow past the first outer cup portion through the plurality of flow channels, each of the plurality of flow channels of the first outer cup portion having an end facing an end of another of the plurality of flow channels, so that a boundary wall is formed between facing ends, each boundary wall positioned symmetrical to another boundary wall relative to the housing axis; and
    a first transducer positioned along the housing axis and within the elongate portion, the first transducer sealed from fluid flow past the first outer cup portion, the first transducer having a width perpendicular to the housing axis and greater than the width of the measurement channel, the first transducer configured to generate an ultrasonic signal and to direct the ultrasonic signal through the measurement channel;
    wherein the first and second ends of the housing are configured to mate with an open pipe end in an in-line manner.

2. The flow rate assembly of claim 1, comprising:
    a second outer cup portion positioned at least partially within the housing, the second outer cup portion comprising:
        an outer head portion connected to a wall of the housing:
        an elongate portion connected to the outer head portion; and
        a plurality of flow channels through the outer head portion configured to permit fluid to flow past the second outer cup portion through the plurality of flow channels, each of the plurality of flow channels of the second outer cup portion having an end facing an end of another of the plurality of flow channels, so that a boundary wall is formed between facing ends, each boundary wall positioned symmetrical to another boundary wall relative to the housing axis; and
    a second transducer positioned within the elongate portion of the second outer cup portion and sealed from fluid flow past the second outer cup portion, the second transducer having a width perpendicular to the housing axis and greater than the width of the measurement channel;
    wherein the second transducer is configured generate an ultrasonic signal and to direct the ultrasonic signal through the measurement channel toward the first transducer.

3. The flow rate assembly of claim 1, wherein the first outer cup portion includes an outlet channel extending between an interior of the elongate portion and an exterior of the elongate portion.

4. The flow rate assembly of claim 3, wherein the outlet channel extends through at least one boundary wall.

5. The flow rate assembly of claim 1, wherein the housing comprises a first housing portion, a second housing portion, and third housing portion positioned between the first and second housing portions, wherein the measurement channel extends through the third housing portion.

6. The flow rate assembly of claim 5, wherein one or more electrical components are positioned within a space between the third housing portion and the first housing portion.

7. A flow rate assembly comprising:
    a housing having:
        a housing axis;
        a first end having an inlet positioned along the housing axis;
        a second end having an outlet positioned along the housing axis;
        a measurement channel extending along the housing axis and through a portion of the housing between the first and second ends of the housing, the measurement channel having a width perpendicular to the housing axis; and
        a first housing chamber between the measurement channel and the inlet, as measured along the housing axis, the first housing chamber having a tapered inner wall;

a first outer cup portion positioned at least partly within the first housing chamber, the first outer cup portion comprising:
  a head portion connected to a wall of the housing;
  an elongate portion connected to the head portion, the elongate portion having a tapered portion between a first face and the inlet and the measurement channel; and
  at least one flow channel through the head portion configured to permit fluid to flow past the first outer cup portion through the at least one flow channel; and
a transducer positioned along the housing axis and within the elongate portion, the transducer sealed from fluid flow past the first outer cup portion, the transducer having a width perpendicular to the housing axis and greater than the width of the measurement channel, the transducer configured to generate an ultrasonic signal and to direct the ultrasonic signal through the measurement channel;
wherein the housing comprises a first housing, a second housing, and a third housing, the third housing positioned between the first housing and the second housing, the flow rate assembly comprising at least one circuit board mounted within a housing interior formed between the first housing and the third housing.

8. The flow rate assembly of claim 7, wherein the head portion of the first outer cup portion forms a port for receiving a wire which communicates with the housing interior formed between the first housing and the third housing.

9. The flow rate assembly of claim 7, comprising an electrical component mounted within a housing interior formed between the second housing and the third housing.

10. The flow rate assembly of claim 9, comprising a cap positioned at the first end of the housing and forming the inlet, wherein the cap is configured to engage with an open fluid conduit and the cap is spin welded to the first outer cup portion.

11. The flow rate assembly of claim 7, wherein the head portion of the first outer cup portion forms a port for receiving a wire which communicates with the housing interior formed between the first housing and the third housing and the transducer is fluidly isolated from fluid flowing through the assembly.

12. The flow rate assembly of claim 7, comprising an inner cup portion positioned at least partially within the elongate portion of the first outer cup portion, wherein the transducer is positioned within the inner cup portion and wherein a connection between the inner cup portion and the first outer cup portion forms a seal to inhibit or prevent fluid ingress into the elongate portion of the first outer cup portion.

13. The flow rate assembly of claim 12, wherein the inner cup portion has a flat face facing the measurement channel.

* * * * *